United States Patent
Shinoda et al.

(10) Patent No.: US 9,970,840 B2
(45) Date of Patent: May 15, 2018

(54) LEAK INSPECTION DEVICE, LEAK INSPECTION METHOD, AND LEAK INSPECTION PROGRAM

(71) Applicant: NEC Corporation, Minato-ku, Tokyo (JP)

(72) Inventors: Shigeki Shinoda, Tokyo (JP); Yasuhiro Sasaki, Tokyo (JP); Masatake Takahashi, Tokyo (JP); Junichiro Mataga, Tokyo (JP); Soichiro Takata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 433 days.

(21) Appl. No.: 14/430,258

(22) PCT Filed: Aug. 19, 2013

(86) PCT No.: PCT/JP2013/072100
§ 371 (c)(1),
(2) Date: Mar. 23, 2015

(87) PCT Pub. No.: WO2014/050358
PCT Pub. Date: Apr. 3, 2014

(65) Prior Publication Data
US 2015/0253216 A1 Sep. 10, 2015

(30) Foreign Application Priority Data
Sep. 27, 2012 (JP) ................. 2012-214811

(51) Int. Cl.
*F17D 5/06* (2006.01)
*G01M 3/24* (2006.01)
*G01M 3/28* (2006.01)

(52) U.S. Cl.
CPC ............. *G01M 3/2807* (2013.01); *F17D 5/06* (2013.01); *G01M 3/243* (2013.01)

(58) Field of Classification Search
CPC ........ F17D 5/06; G01M 3/243; G01M 3/2807
See application file for complete search history.

(56) References Cited

U.S. PATENT DOCUMENTS 5,272,464 A * 12/1993 Jorgensen ........... B60R 16/0373
340/438
6,404,343 B1 * 6/2002 Andou ................. G01M 3/243
340/605

(Continued)

FOREIGN PATENT DOCUMENTS

EP     2028471 A2   2/2009
JP     62-055540 A  3/1987

(Continued)

OTHER PUBLICATIONS

Extended European Search Report for EP Application No. EP13841540.1 dated May 12, 2016.

(Continued)

*Primary Examiner* — Bryan Bui

(57) ABSTRACT

Each functional configuring unit of a leak inspection device (2000) operates in the manner that follows. A vibration acquisition unit (2020) acquires a signal indicating tubing vibrations or vibrations propagated from tubing. A filtering unit (2040) extracts a signal of a predetermined frequency band from the signal acquired by the vibration acquisition unit (2020). A characteristic value extraction unit (2060) splits the signal extracted by the filtering unit (2040) into predetermined time intervals, calculates for each split signal the absolute value of each extreme value of the magnitude of the signal, performs for each split signal a statistical process with respect to the calculated plurality of absolute values, and considers values calculated by the statistical process to be characteristic values. A leak determination unit (2080) considers inspection results to indicate the presence of a leak when a determination index value stipulated using (Continued)

the characteristic values is greater than a predetermined threshold.

18 Claims, 20 Drawing Sheets

(56) References Cited

U.S. PATENT DOCUMENTS

2005/0279169 A1    12/2005   Lander
2008/0314123 A1    12/2008   Kaji et al.

FOREIGN PATENT DOCUMENTS

| JP | 63-070138 A | 3/1988 |
| JP | 11-072409 A | 3/1999 |
| JP | 2006-317172 A | 11/2006 |
| JP | 2006-349572 A | 12/2006 |
| JP | 2009-002873 A | 1/2009 |
| JP | 2012-037492 A | 2/2012 |

OTHER PUBLICATIONS

International Search Report for PCT Application No. PCT/JP2013/072100, dated Oct. 29, 2013.
English Translation of write opinion for PCT Application No. PCT/JP2013/072100.

* cited by examiner

LEAK INSPECTION DEVICE, LEAK INSPECTION METHOD, AND LEAK INSPECTION PROGRAM

This application is a National Stage Entry of PCT/JP2013/072100 filed on Aug. 19, 2013, which claims priority from Japanese Patent Application 2012-214811 filed on Sep. 27, 2012, the contents of all of which are incorporated herein by reference, in their entirety.

TECHNICAL FIELD

The present invention relates to a leak inspection device, a leak inspection method, and a leak inspection program.

BACKGROUND ART

As social infrastructure, equipment such as water and wastewater systems, high-pressure chemistry pipelines for gas, petroleum and the like, high-speed railways, long big bridges, superhigh-rise buildings, large passenger aircrafts, and vehicles is built. One of important members in the equipment is pipes for passing a fluid such as gas or water. There is a case that pipes are broken due to deterioration or a natural disaster. When pipes are broken and the fluid leaks out, a broken part is required to be repaired. For this purpose, leak of the fluid in the pipes is required to be detected. Hereinbelow, an inspection of the presence/absence of a leak of a fluid in pipes will be called a leak inspection.

A general leak inspection is an auditory sensory inspection of listening to a leak sound by a person. In many cases, however, pipes are arranged under the ground or at a high place, so that an inspection by manpower involves a risk and great effort. To address the problem, devices performing a leak inspection have been proposed.

A leak inspection device described in PTL1 detects a leak by converting a sound detected around a pipe to an electric signal and analyzing the electric signal. The device splits the electric signal acquired from the obtained sound into signals with different frequencies by using a plurality of band-pass filters. The amplitude of an electric signal at each frequency is compared with a threshold. When the amplitude of the electric signal exceeds the threshold in all of the plurality of signals, a leak is determined.

A device described in PTL2 determines the presence/absence of a water leak from the ratio between the number of counts that a vibration level of a pipe due to a water leak exceeds a determination level and the number of counts where the vibration level is less than the determination level.

A device described in PTL3 detects the presence/absence of a water leak by using detection signals acquired by underwater microphones installed at both ends of an inspection section. In the method, the presence/absence of a water leak is determined by generating a composite waveform obtained by adding waveforms having high correlation function of signals detected in temporary sound source positions which are set.

A device described in PTL4 acquires vibrations for predetermined time in a plurality of places using a synchronization signal as a measurement start reference and determines the presence/absence of a water leak.

CITATION LIST

Patent Literature

PTL1: Japanese Laid-open Patent Publication No. 62-055540A
PTL2: Japanese Laid-open Patent Publication No. 2012-37492A
PTL3: Japanese Laid-open Patent Publication No. 11-72409A
PTL4: Japanese Laid-open Patent Publication No. 2006-317172A

SUMMARY OF INVENTION

Technical Problem

Much effort is required to maintain a leak inspection device. One of the reasons is that since pipes are often arranged under the ground or at a high place, the leak inspection device is also often arranged under the ground or at a high place. Another reason is that a number of leak inspection devices are installed for a pipe. Consequently, to lower the frequency of maintenance of a leak inspection device, the inventors of the present invention have examined to reduce energy consumption of the leak inspection device and increase the operation life of the leak inspection device.

An object of the present invention is to provide a leak inspection device with small energy consumption, a leak inspection program for controlling the leak inspection device, and a leak inspection method.

Solution to Problem

A leak inspection device provided by the present invention includes: vibration acquisition means for acquiring a signal indicating a vibration of a pipe or a vibration propagating from a pipe; filtering means for extracting a signal in one frequency band from the signal; characteristic value extracting means for dividing the extracted signal at predetermined time intervals, calculating an absolute value for each of a plurality of extreme values of magnitude of each of the divided signals, performing a statistical process on the plurality of absolute values calculated for each of the divided signals, and extracting a value calculated by the statistical process as a characteristic value; and leak determining means for determining the presence of a leak as an inspection result when a determination index value determined by using the characteristic value is larger than a predetermined threshold.

A leak inspection program provided by the present invention makes a computer have functions to operate as a leak inspection device provided by the present invention. The program makes the computer have functions of functional components of a leak inspection device provided by the present invention.

A leak inspection method provided by the present invention is a method of inspecting a leak in a pipe, executed by a computer. The leak inspection method includes: a vibration acquiring step of acquiring a signal indicating a vibration of a pipe or a vibration propagating from a pipe; a filtering step of extracting a signal in one frequency band from the signal; a characteristic value extracting step of dividing the extracted signal at predetermined time intervals, calculating an absolute value of each of a plurality of extreme values of magnitude of each of the divided signals, performing a statistical process on the plurality of absolute values calculated for each of the divided signals, and extracting a value calculated by the statistical process as a characteristic value; and a leak determining step of determining the presence of a leak as an inspection result when a determination index value determined by using the characteristic value is larger than a predetermined threshold.

Advantageous Effects of Invention

The present invention can provide a leak inspection device with small energy consumption, a leak inspection program for controlling the leak inspection device, and a leak inspection method.

BRIEF DESCRIPTION OF DRAWINGS

The above-described object, the other objects, features, and advantages will become more apparent by the following preferred exemplary embodiments and the following drawings accompanying the exemplary embodiments.

DESCRIPTION OF EMBODIMENTS

Hereinafter, exemplary embodiments of the present invention will be described with reference to the drawings. In all of the drawings, similar numerals are designated to similar components, and repetitive description will not be properly given.

In the following description, each component of each device is not a configuration of a hardware unit but expresses a block of a function unit. Each component of each device is realized by an arbitrary combination of hardware and software such as a CPU of an arbitrary computer, a memory, a program realizing a component of the diagram loaded to the memory, storage media such as a hard disk storing the program, and an interface for network connection. There are various modifications to the methods and devices that realize the components.

First Exemplary Embodiment

Outline

Figure 1:
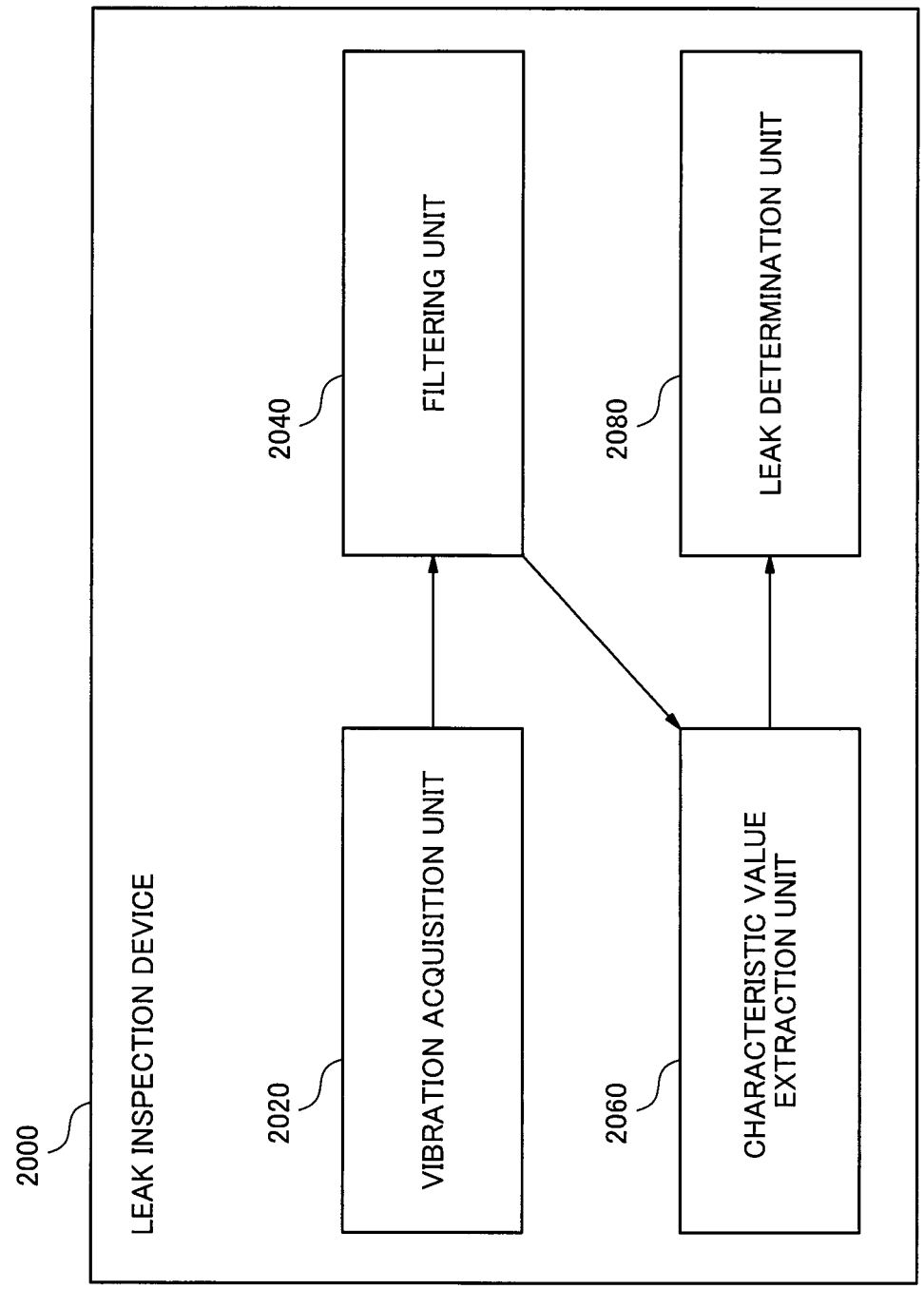
FIG. 1 is a block diagram illustrating a leak inspection device according to a first exemplary embodiment.

FIG. 1 is a block diagram illustrating a leak inspection device 2000 according to a first exemplary embodiment. In FIG. 1, arrows express the flow of information.

The leak inspection device 2000 has a vibration acquisition unit 2020. The vibration acquisition unit 2020 obtains a signal indicative of a vibration of a pipe or of a vibration propagating from a pipe.

The leak inspection device 2000 has a filtering unit 2040. The filtering unit 2040 extracts a signal of a predetermined frequency band from a signal obtained by the vibration acquisition unit 2020. Hereinbelow, to distinguish a signal obtained by the vibration acquisition unit 2020 and a signal after the filtering unit 2040 performs a filtering process from each other, the former signal will be described as a source signal, and the latter signal will be described as an extraction signal.

The leak inspection device 2000 has a characteristic value extraction unit 2060. The characteristic value extraction unit 2060 splits the extraction signal at predetermined time intervals and extracts a characteristic value from each of split extraction signals. The characteristic value is a value obtained by performing a statistical process on an absolute value of an extreme value of the signal magnitude indicated by the split extraction signal.

The leak inspection device 2000 has a leak determination unit 2080. The leak determination unit 2080 determines the presence/absence of a leak in a pipe by using a determination index value determined on the basis of the characteristic value. Concretely, when the determination index value is larger than a predetermined threshold, the leak determination unit 2080 determines the presence of a leak as the inspection result.

As described above, the leak inspection device 2000 determines a determination index value on the basis of characteristic values extracted from extraction signals split by predetermined periods. When the determination index value is larger than a predetermined threshold, the presence of a leak is determined as an inspection result. Therefore, the leak inspection device 2000 can determine the presence/absence of a leak by smaller number of processes as compared with the case of comparing all of values expressing extraction signals with the predetermined threshold. Consequently, the leak inspection device 2000 can operate with smaller energy consumption.

Hereinbelow, the details of the exemplary embodiment will be described.

Details of Vibration Acquisition Unit 2020

The vibration acquisition unit 2020 obtains a vibration of a pipe or a signal indicative of the vibration propagating from the pipe as a source signal. Concretely, the source signal expresses, for example, the magnitude of the vibration of the pipe or the magnitude of the vibration propagating from the pipe in chronological order. The source signal may be an analog signal or a digital signal. A vibration of a pipe or a vibration propagating from a pipe is measured by, for example, a vibration sensor. As the vibration sensor, for example, a piezoelectric vibration sensor can be preferably used. Hereinbelow, a device performing the measurement will be described as a vibration measuring device. The vibration measuring device may be directly mounted on a pipe or may be mounted in/on the ground around a pipe.

When obtaining the source signal as an analog signal, the vibration digital signal acquisition unit 2020 obtains an analog signal as a result of measurement of the above-described vibration measuring device from the vibration measuring device. The vibration measuring device may be provided on the outside or inside of the leak inspection device 2000. When the vibration measuring device is on the outside of the leak inspection device 2000, the leak inspection device 2000 and the vibration measuring device are connected so as to be able to communicate with each other.

When the leak inspection device 2000 has a vibration measuring device on the inside, it is preferable to limit the measurement band of the vibration measuring device to 1 Hz to 10 kHz. By limiting the measurement range of the measuring device, time required for the vibration measuring device to measure analog signals of an amount necessary for an inspection can be shortened. Consequently, the energy of the leak inspection device 2000 becomes small.

When obtaining the source signal as an analog signal, the leak inspection device 2000 has an AD conversion unit for converting an analog signal to a digital signal. The AD conversion unit is, for example, an analog-to-digital converter (AD converter).

Details of Filtering Unit 2040

The filtering unit 2040 is, for example, a high-pass filter, a low-pass filter, a bandpass filter, or a combination of those filters.

When the vibration acquisition unit 2020 obtains an analog signal, the filtering unit 2040 has an AD conversion unit. The filtering unit 204 extracts, for example, an analog signal in a predetermined frequency band from the analog signal obtained by the vibration acquisition unit 2020 and, after that, converts the analog signal in the predetermined frequency band to a digital signal by the AD conversion unit. In this case, the above-described filters such as the high-pass filter are analog filters. After conversion of the analog signal obtained from the vibration acquisition unit 2020 to a digital signal by the AD conversion unit, the filtering unit 2040 may extract a digital signal of a predetermined frequency from the digital signal. In this case, the above-described filters such as the high-pass filter are digital filters.

The filtering unit 2040 extracts a signal in a predetermined frequency band from a source signal. There are various methods of obtaining information indicative of the predetermined frequency band by the filtering unit 2040. The information indicative of the predetermined frequency band is, for example, the upper-limit value and the lower-limit value of the predetermined frequency band. The filtering unit 2040 obtains, for example, information indicative of a predetermined frequency band which is manually input to the leak inspection device 2000. The filtering unit 2040 also obtains, for example, information indicative of a predetermined frequency band supplied from an external device which is connected to the leak inspection device 2000 so as to be able to communicate with each other. The filtering unit 2040 may also obtain information indicative of a predetermined frequency band which is fixedly set in the filtering unit 2040 at the time of manufacturing the filtering unit 2040.

Details of Characteristic Value Extraction Unit 2060

As described above, the characteristic value extraction unit 2060 extracts a characteristic value by performing a statistical process on an absolute value of an extreme value of a signal magnitude indicated by a split extraction signal. There are various statistical processes performed by the characteristic value extraction unit 2060. The statistical process is, for example, a process of calculating a minimum value or an average value of absolute values of extreme values of a plurality of signal magnitudes.

Figure 2:
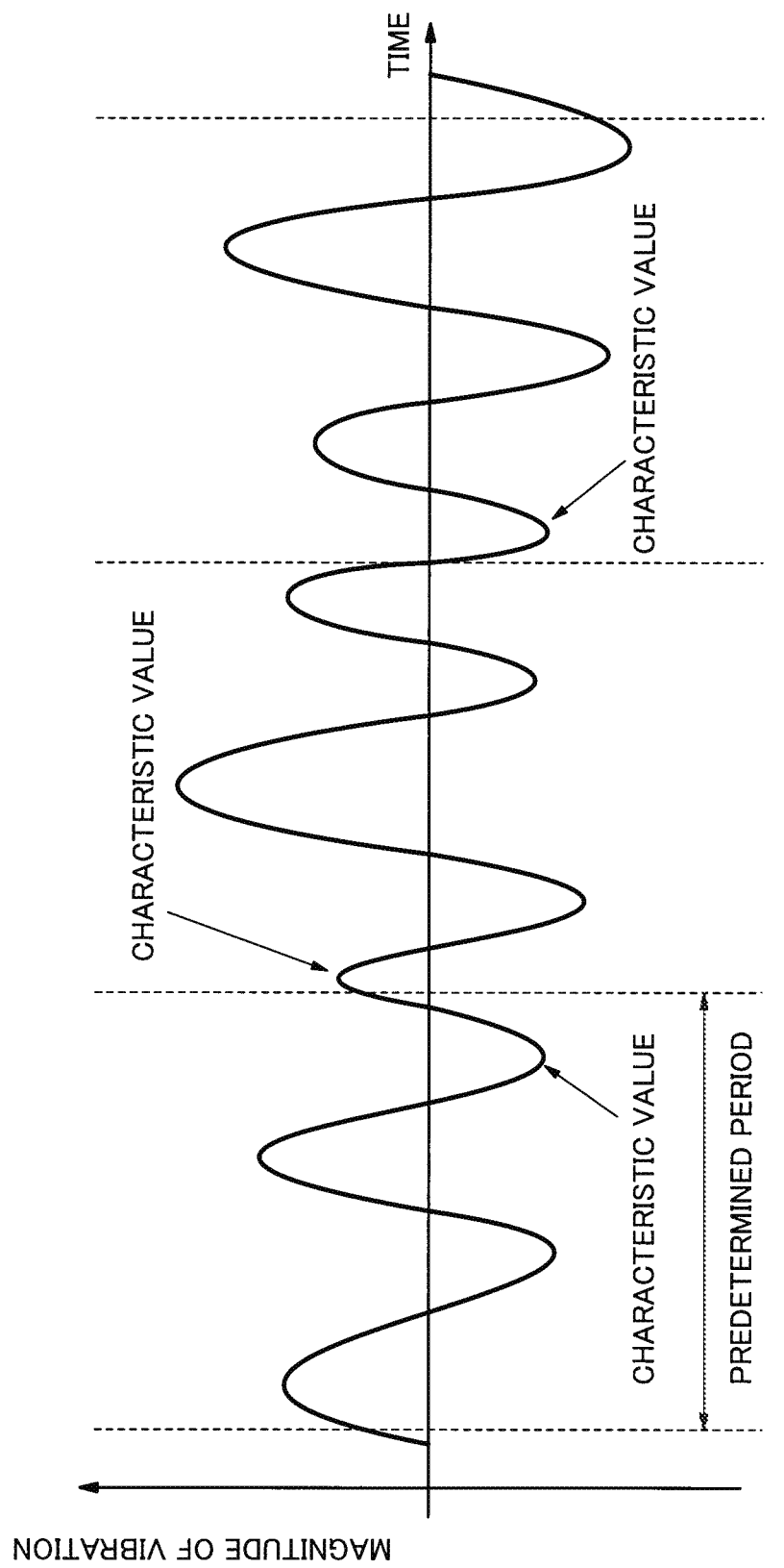
FIG. 2 is a diagram conceptually illustrating a method of extracting a characteristic value by the leak inspection device according to the first exemplary embodiment.

FIG. 2 is a diagram conceptually illustrating a state of a case of using a process of calculating a minimum value as the statistical process. In this case, the characteristic value extraction unit 2060 extracts, as a characteristic value, the smallest one of absolute values of extreme values of signal magnitudes from extraction signals split by predetermined periods. By using the minimum value as the statistical value, when the magnitude of a signal obtained by the vibration acquisition unit 2020 becomes temporarily large due to an abrupt disturbance, it can prevent the leak inspection device 2000 from erroneously detecting occurrence of a leak in a pipe on the basis of the temporarily large signal due to the disturbance. Consequently, the precision of an inspection on the presence/absence of a leak performed by the leak inspection device 2000 becomes higher.

Details of Leak Determination Unit 2080

The leak determination unit 2080 determines a determination index value on the basis of the characteristic value obtained from the characteristic value extraction unit 2060. For example, the leak determination unit 2080 determines the characteristic value obtained from the characteristic value extraction unit 2060 as a determination index value.

Figure 3:
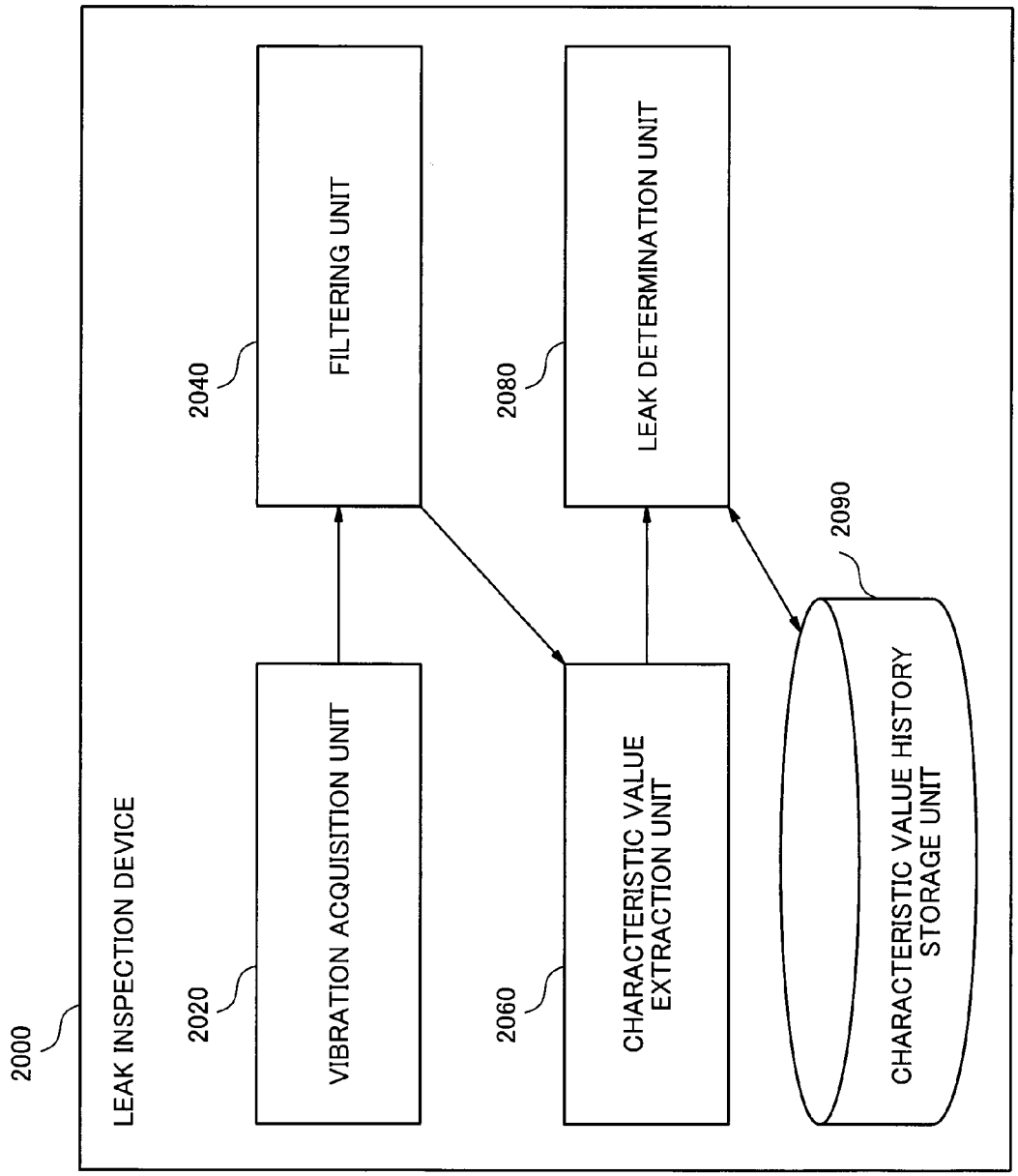
FIG. 3 is a block diagram illustrating the leak inspection device according to the first exemplary embodiment calculating a characteristic value acceleration.

Alternatively, for example, the leak determination unit 2080 determines, as a determination index value, a value expressing the degree of increase of a present characteristic value calculated on the basis of a characteristic value obtained from the characteristic value extraction unit 2060 and a characteristic value extracted in the past by the characteristic value extraction unit 2060. Hereinbelow, the value expressing the degree of increase of the characteristic value will be called a characteristic value acceleration. In this case, as illustrated in FIG. 3, the leak inspection device 2000 has a characteristic value history storage unit 2090. The characteristic value history storage unit 2090 creates an association between a characteristic value extracted by the characteristic value extraction unit 2060 and information indicative of a time point when the characteristic value is extracted and stores it as characteristic value history.

The leak determination unit 2080 can use, for example, a characteristic value acceleration calculated by the following method as a determination index value. First, the leak determination unit 2080 performs a calculation by the following equation 1. Parameter si denotes a characteristic value extracted from extraction signals expressing the magnitudes of vibrations in the i-th period (hereinbelow, period pi) as a period obtained by dividing time using a reference time point of a leak inspection as a start time into predetermined periods. Parameter ai indicates characteristic value acceleration in the period pi.

$$a_i = s_i - s_{i-1} \qquad \text{Equation 1}$$

The leak determination unit 2080 may use bi calculated by the following equation 2 as characteristic value acceleration. Parameter bi denotes a value obtained by normalizing ai with an initial value a0.

$$b_i = \frac{a_i}{a_0} - 1 \qquad \text{Equation 2}$$

The leak determination unit 2080 may use ci calculated by the following equation 3 as characteristic value acceleration. Parameter ci denotes a value indicating the degree of increase of ai in the period pi from ai−1 in a period pi−1 just before the period pi. Parameter Δti denotes a value expressing a time interval between the period pi and the period pi−1. For example, Δti is a value obtained by subtracting a value expressing the start point of the period pi−1 from a value expressing the start point of the period pi.

$$c_i = \frac{a_i - a_{i-1}}{\Delta t_i} - 1 \qquad \text{Equation 3}$$

In addition, for example, the leak determination unit 2080 can also use, as a determination index value, a value obtained by adding characteristic value acceleration indicative of the degree of increase in a characteristic value at present and characteristic value acceleration indicative of the degree of increase in a characteristic value in the past. In this case, for example, the leak determination unit 2080 calculates a determination index value by the following equation 4. Parameter di denotes a determination index value in the period pi.

$$d_i = a_i - a_0 + d_{i-1} \qquad \text{Equation 4}$$

The leak determination unit 2080 compares the determination index value with a predetermined threshold. There are various methods of obtaining the predetermined threshold by the leak determination unit 2080. The leak determination unit 2080 obtains, for example, a predetermined threshold manually supplied to the leak inspection device 2000. Alternatively, for example, the leak determination unit 2080 obtains a predetermined threshold supplied from an external device which is connected to the leak inspection device 2000 so as able to communicate with the leak inspection device 2000. The leak determination unit 2080 may obtain a predetermined threshold fixedly set in the leak determination unit 2080 at the time of manufacturing the leak determination unit 2080.

Notification of Inspection Result

The leak inspection device 2000 notifies, for example, the outside of an inspection result by the leak determination unit 2080. The notification destination of the inspection result is, for example, an external device such as a server communicatably connected to the leak inspection device 2000. The connection method may be wired connection, wireless connection, or a connection method in which the wired connection and the wireless connection mixedly exist.

Flow of Leak Inspecting Process

Figure 4:
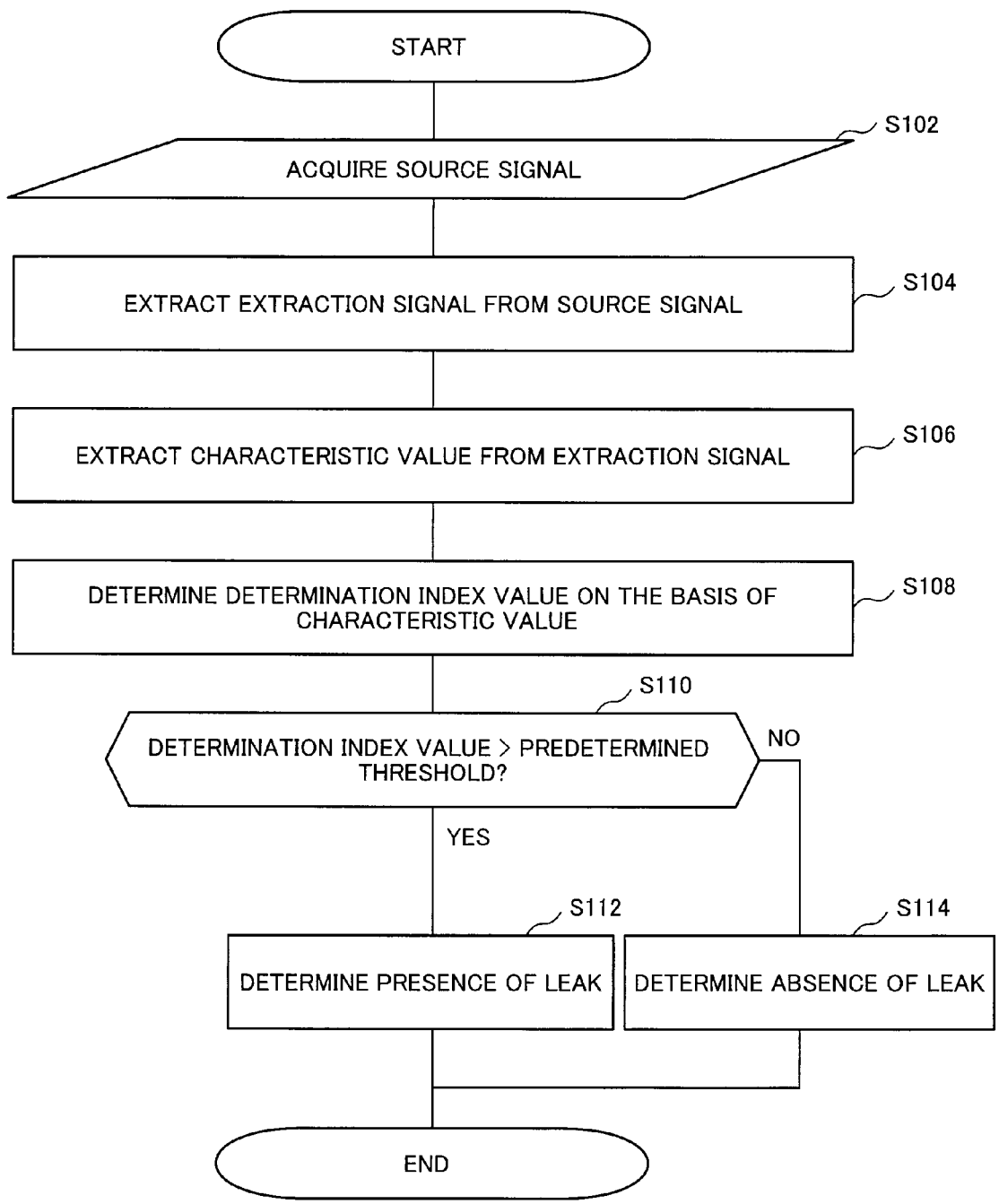
FIG. 4 is a flowchart illustrating an example of the flow of a leak inspecting process performed by the leak inspection device according to the first exemplary embodiment.

FIG. 4 is a flowchart expressing an example of the flow of a leak inspecting process by the leak inspection device 2000 of the exemplary embodiment.

In step S102, the vibration acquisition unit 2020 obtains a source signal. As described above, the source signal is a signal expressing the magnitude of a vibration of a pipe or the magnitude of a vibration propagating from a pipe in chronological order.

In step S104, the filtering unit 2040 extracts an extraction signal from a source signal. As described above, the extraction signal is a signal in a predetermined frequency band extracted from a source signal.

In step S106, the characteristic value extraction unit 2060 extracts a characteristic value from an extraction signal.

In step S108, the leak determination unit 2080 determines a determination index value on the basis of a characteristic value.

In step S110, the leak determination unit 2080 determines whether the determination index value is larger than a predetermined threshold or not. When the determination index value is larger than the predetermined threshold, the leak determination unit 2080 advances to step S112. On the other hand, when the determination index value is equal to or less than the predetermined threshold, the leak determination unit 2080 advances to step S114.

In step S112, the leak determination unit 2080 determines that a leak occurs in the pipe.

In step S114, the leak determination unit 2080 determines that no leak occurs in the pipe.

First Modification

Figure 5:
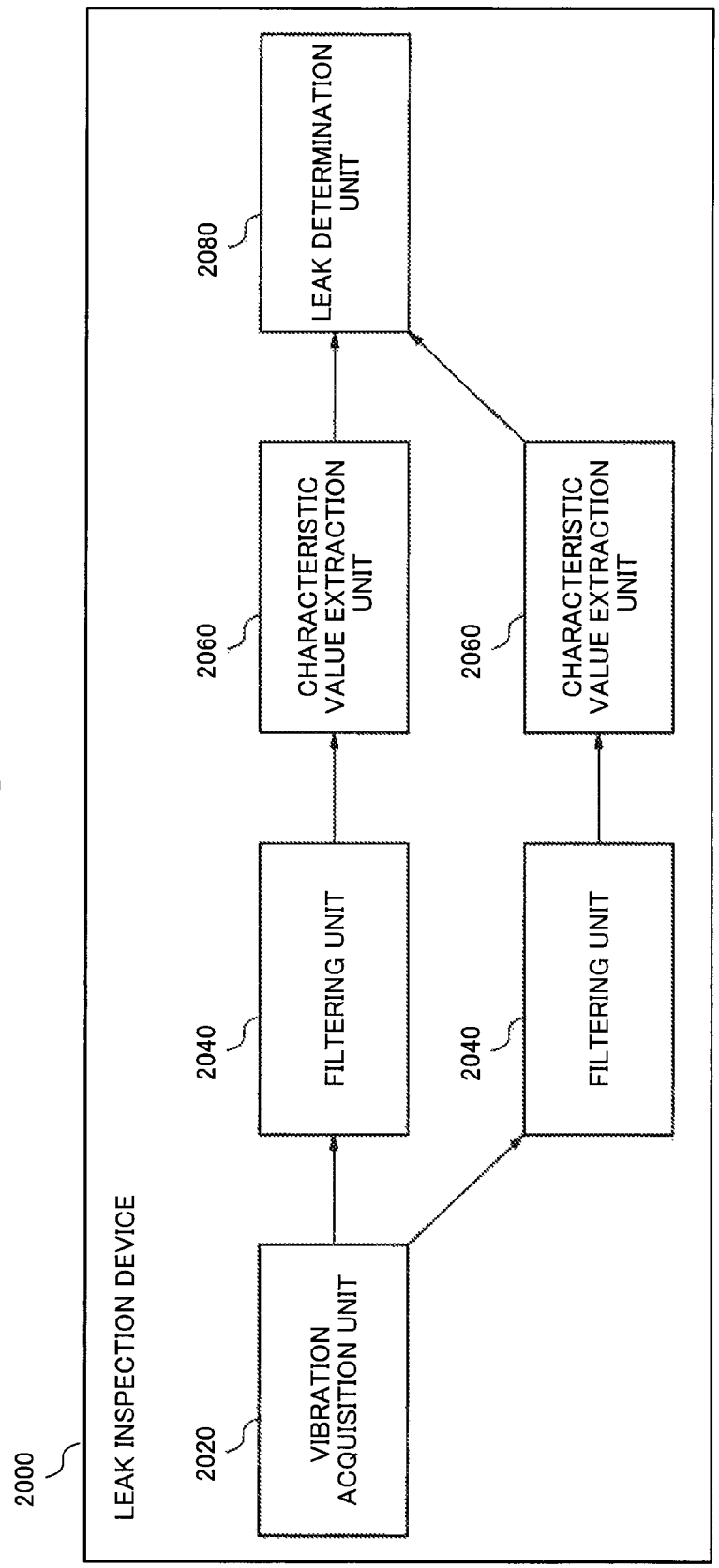
FIG. 5 is a block diagram illustrating a leak inspection device according to a first modification.

The leak inspection device 2000 according to the exemplary embodiment may have a plurality of filtering units 2040 whose predetermined frequency bands are different from each other and a plurality of characteristic value extraction units 2060 corresponding to the filtering units 2040. The configuration of the leak inspection device 2000 in this case is, for example, the configuration illustrated in the block diagram of FIG. 5. The leak inspection device 2000 in this aspect will be called the leak inspection device 2000 of the first modification.

The leak inspection device 2000 of the first modification extracts a plurality of extraction signals of different frequency bands from a single source signal by the plurality of filtering units 2040. The characteristic value extraction unit 2060 extracts a characteristic value from an extraction signal extracted by the corresponding filtering unit 2040.

The leak determination unit 2080 of the leak inspection device 2000 of the first modification obtains a characteristic value from each of the plurality of characteristic value extraction units 2060. The leak determination unit 2080 determines a determination index value on the basis of each of the characteristic values. The leak determination unit 2080 determines the presence/absence of a leak by comparing each of the determination index values with a predetermined threshold. For example, when any of the determination index values is larger than a predetermined threshold, the leak determination unit 2080 determines the presence of a leak as an inspection result. For example, when it is determined that predetermined number or more determination index values indicate the possibility of a leak, the leak determination unit 2080 determines the presence of a leak as an inspection result. The predetermined threshold may be a value common to the determination index values or different values corresponding to the characteristic value extraction units 2060 extracting characteristic values.

Operation and Effect

With the above-described configuration, according to the exemplary embodiment, the vibration acquisition unit 2020 obtains signals (source signals) expressing the magnitudes of vibrations of a pipe or the magnitudes of vibrations propagating from a pipe in chronological order. The filtering unit 2040 extracts a signal in a predetermined frequency band (extraction signal) from the obtained source signals. The characteristic value extraction unit 2060 divides the extraction signal at predetermined time intervals and extracts a characteristic value from each of the divided extraction signals. When a determination index value determined on the basis of the characteristic value is larger than a predetermined threshold, the leak determination unit 2080 determines the presence of a leak as an inspection result. Therefore, the leak inspection device 2000 can determine the presence/absence of a leak by smaller number of processes as compared with the case of comparing all of values expressing extraction signals with the predetermined threshold. Consequently, the leak inspection device 2000 can operate with smaller energy consumption.

Further, in the first modification, the leak inspection device 2000 extracts a plurality of extraction signals in different frequency bands from the source signals. The leak inspection device 2000 determines the presence/absence of a leak on the basis of a plurality of determination index values based on the extraction signals. The leak inspection device 2000 can narrow the frequency band of each of the extraction signals by extracting the plurality of extraction signals in different frequency bands from the source signals. Generally, disturbance such as domestic wastewater exerts a large influence on a signal in a specific narrow frequency band in the source signals. Therefore, the leak inspection device 2000 can limit extraction signals influenced by the disturbance to a part of the extraction signals by making the frequency bands of the extraction signals extracted from the source signals different narrow ranges. Consequently, the leak inspection device 2000 of the first modification can calculate a number of determination index values with high precision. Therefore, the leak inspection device 2000 of the first modification can examine the presence/absence of a leak with high precision.

Second Exemplary Embodiment

Outline

Figure 6:
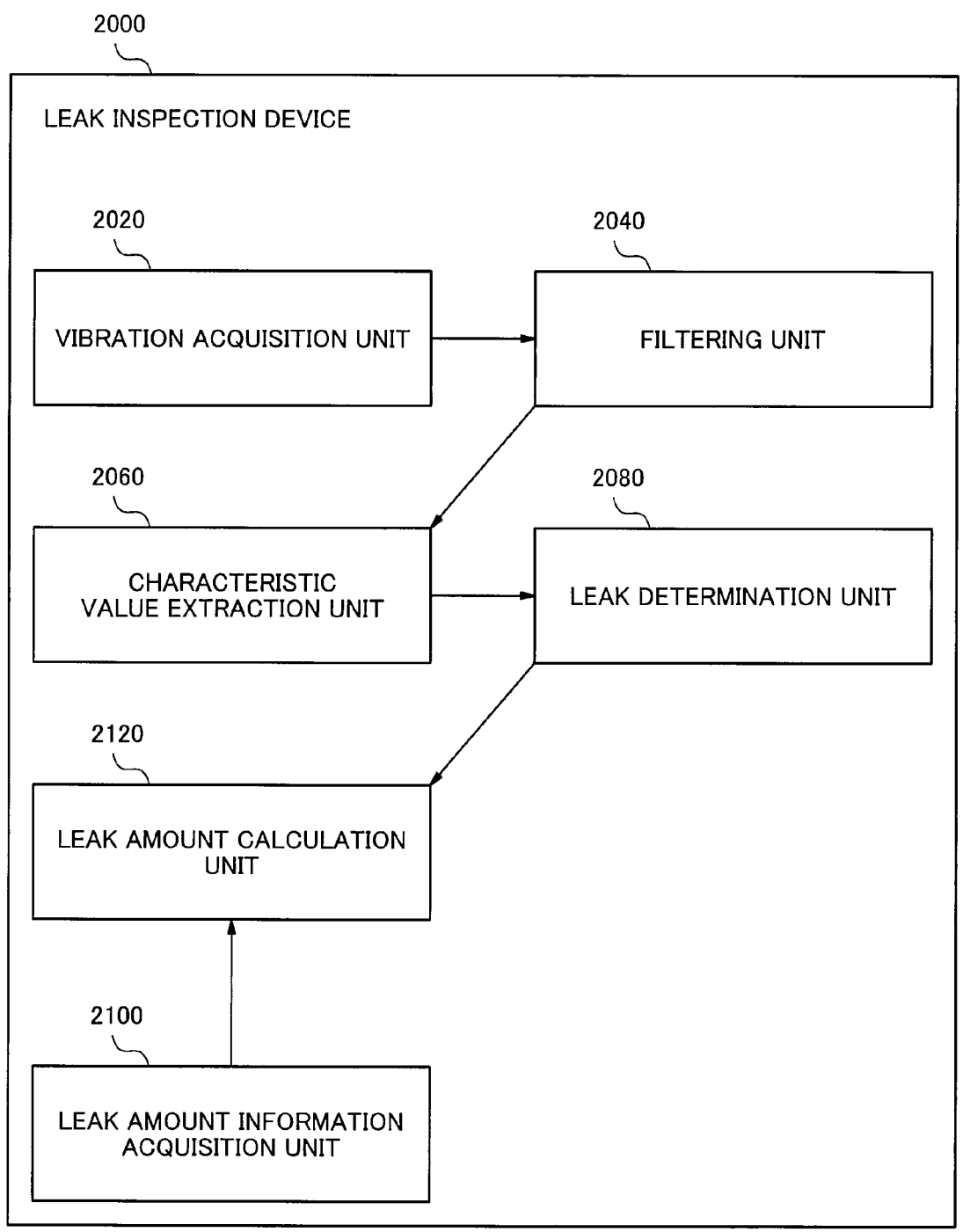
FIG. 6 is a block diagram illustrating a leak inspection device according to a second exemplary embodiment.

FIG. 6 is a block diagram illustrating a leak inspection device 2000 according to a second exemplary embodiment. Unless otherwise described, in the functional blocks illustrated in FIG. 6, the functional blocks having the same numerals as those in FIG. 1 have the same functions as the functional blocks of FIG. 1. Therefore, the description of those functional blocks will not be repeated.

Figure 7:
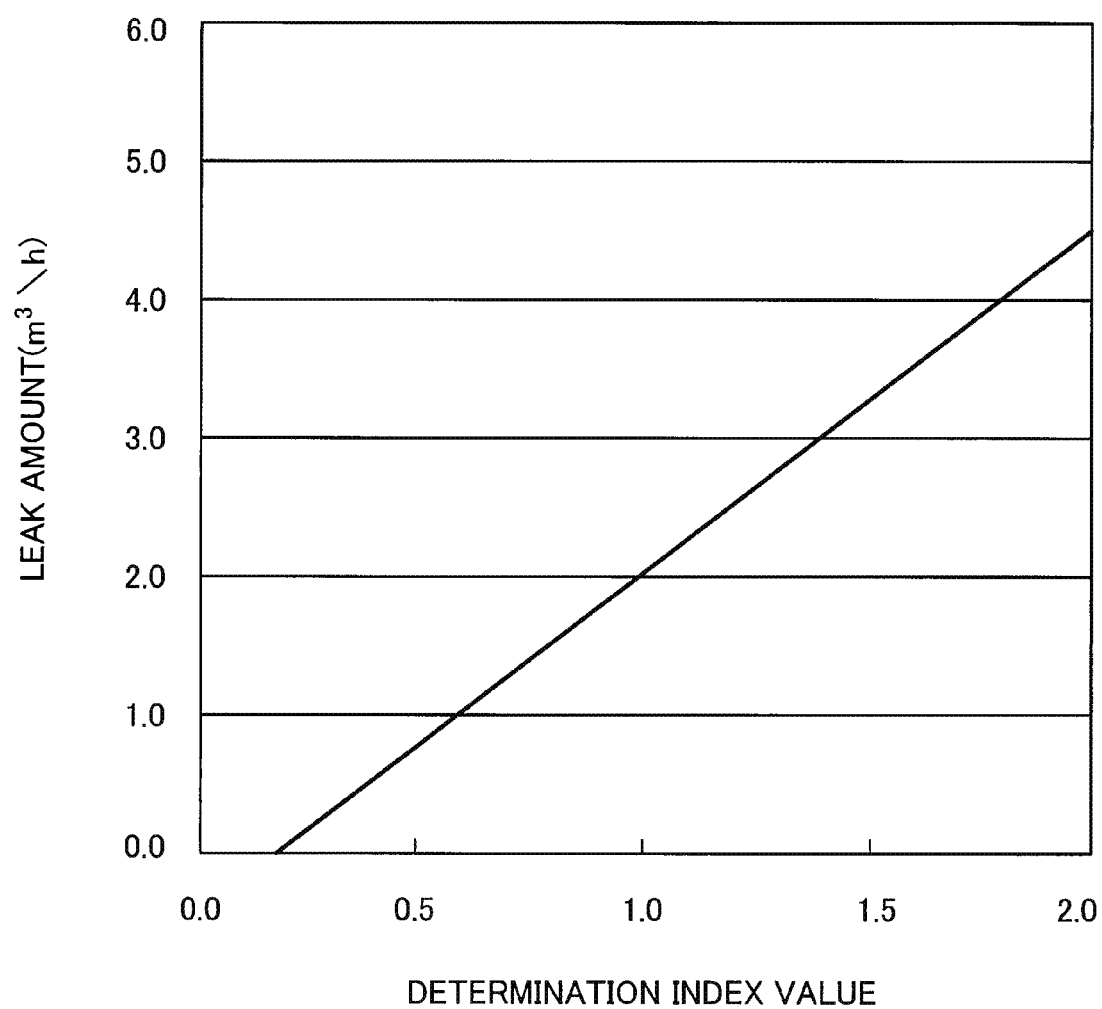
FIG. 7 is a graph illustrating a calibration curve as an information example of leak amount information.

The leak inspection device 2000 of the exemplary embodiment further includes a leak amount information acquisition unit 2100 and a leak amount calculating unit 2120. The leak amount information acquisition unit 2100 obtains leak amount information as information indicating association between the above-described determination index value and a leak amount. The leak amount information is, for example, information expressing a calibration curve indicative of the relation between the determination index value and the leak amount illustrated in FIG. 7. Alternatively, the leak amount information may be, for example, a value indicative of the leak degree. For example, the leak amount calculating unit 2120 obtains the flow of a fluid flowing in a pipe in normal times and calculates a leak amount on the basis of the obtained flow in normal times and the value indicative of the leak degree. The flow of the fluid flowing in the pipe in normal times can be obtained from, for example, a control person or the like of the pipe.

The leak amount calculating unit 2120 uses a determination index value obtained from the leak determination unit 2080 and calculates a leak amount corresponding to the determination index value from the leak amount information obtained by the leak amount information acquisition unit 2100.

Flow of Leak Amount Calculating Process

Figure 8:
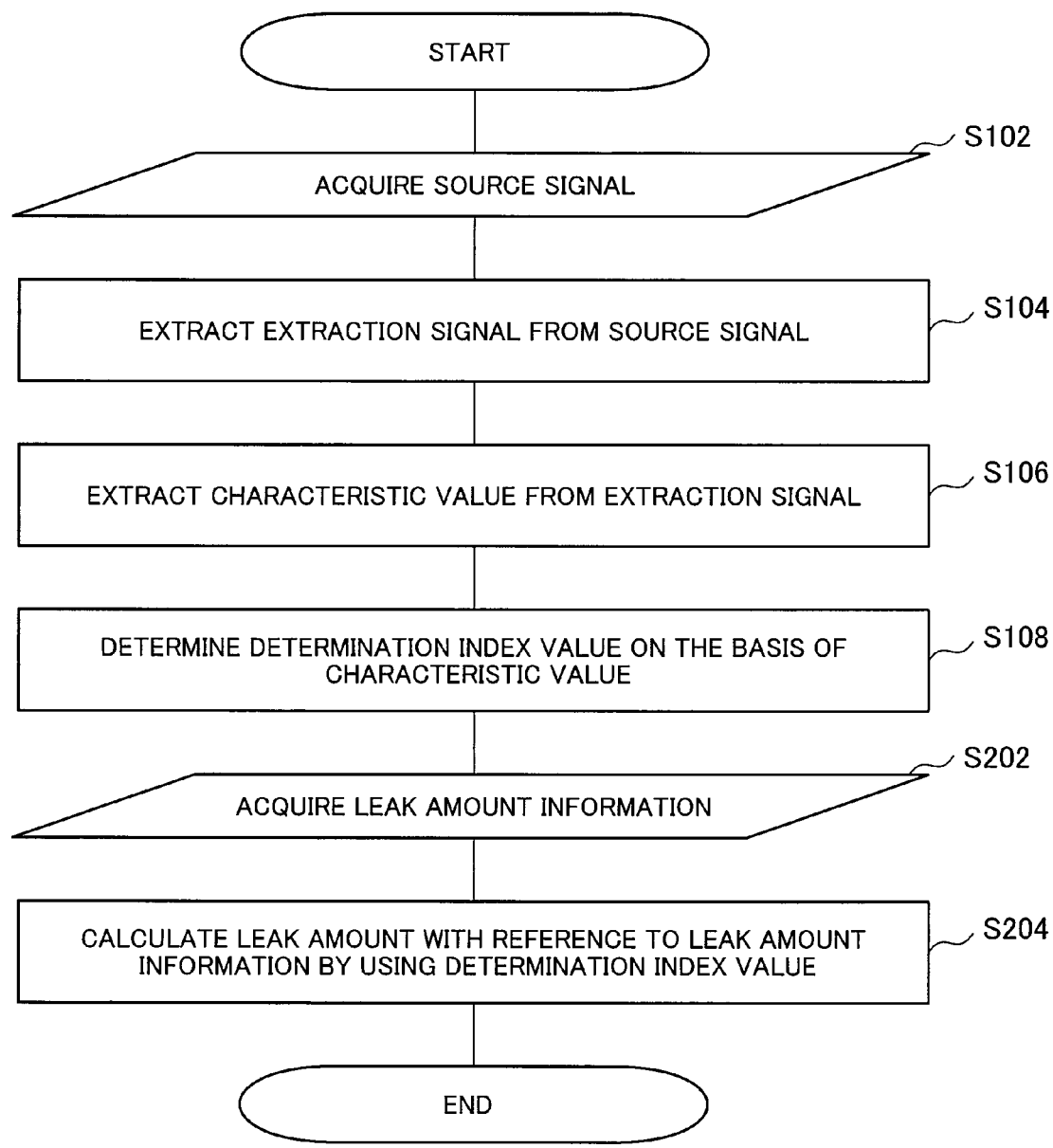
FIG. 8 is a flowchart illustrating an example of the flow of a leak amount calculating process performed by the leak inspection device according to the second exemplary embodiment.

FIG. 8 is a flowchart expressing an example of the flow of a leak amount calculating process by the leak inspection device 2000 of the exemplary embodiment. Steps S102 to S108 in FIG. 8 are the same processes as those of the steps S102 to S108 in FIG. 4 described in the first exemplary embodiment. Consequently, the description of the steps S102 to S108 will not be repeated.

In step S202, the leak amount information acquisition unit 2100 obtains leak amount information.

In step S204, the leak amount calculating unit 2120 uses a determination index value obtained from the leak determination unit 2080 and calculates a leak amount corresponding to the determination index value from the leak amount information obtained by the leak amount information acquisition unit 2100.

Second Modification

Figure 9:
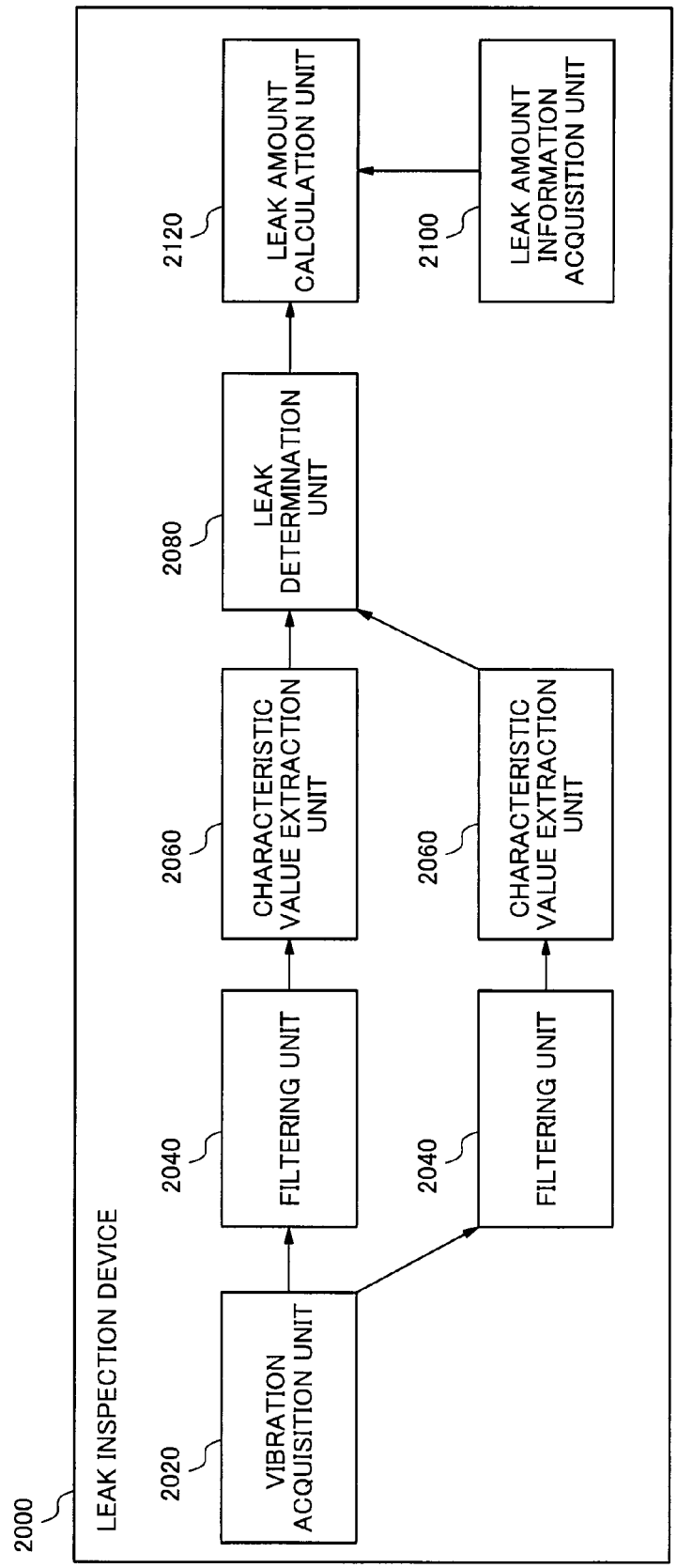
FIG. 9 is a block diagram illustrating a leak inspection device according to a second modification.

In a manner similar to the first modification, the leak inspection device 2000 of the exemplary embodiment may have a plurality of filtering units 2040 and a plurality of characteristic value extraction units 2060 (refer to FIG. 9). In this case, the leak amount calculating unit 2120 obtains a plurality of determination index values from the leak determination unit 2080. The leak amount calculating unit 2120 uses each of the plurality of determination index values and calculates leak amounts corresponding to the determination index values from the leak amount information. The leak amount calculating unit 2120 determines a leak amount as a final calculation result on the basis of the plurality of leak amounts calculated. For example, the leak amount calculating unit 2120 uses a result obtained by performing a statistical process on the plurality of leak amounts calculated as a final calculation result. The statistical process is a process of calculating, for example, an average value, a maximum value, a minimum value, or the like.

The leak amount calculating unit 2120 may calculate a leak amount by using a part of the plurality of determination index values. For example, the leak amount calculating unit 2120 calculates a leak amount by using only determination index values larger than a predetermined threshold used by the leak determination unit 2080 in the plurality of determination indexes. In such a manner, using only determination index values indicating the presence of a leak, a leak amount is calculated. By the operation, the determination index value based on a signal in a frequency band which does not indicate a leak is excluded from calculation of a leak amount, and a leak amount can be calculated with higher precision.

Operation and Effect

With the above configuration, according to the exemplary embodiment, the leak inspection device 2000 can calculate the amount of a fluid leaked from a pipe on the basis of a signal indicating the magnitude of a vibration of a pipe or the magnitude of a vibration propagating from a pipe. Consequently, the leak inspection device 2000 can provide information indicative of necessity of a process on a pipe such as repair of the pipe.

Further, in the second modification, the leak inspection device 2000 calculates a leak amount from each of a plurality of determination index values based on a plurality of extraction signals in different frequency bands. The leak inspection device 2000 calculates a leak amount as a final calculation result on the basis of the leak amount calculated from each of the determination index values. By using a plurality of determination index values based on a plurality of extraction signals in different frequency bands, the leak inspection device 2000 can limit determination index values influenced by a disturbance such as domestic wastewater to a part of the determination index values. Consequently, the leak inspection device 2000 of the second modification can calculate a number of determination index values with high precision. Therefore, the leak inspection device 2000 can calculate a leak amount with high precision.

Third Exemplary Embodiment

Outline

Figure 10:
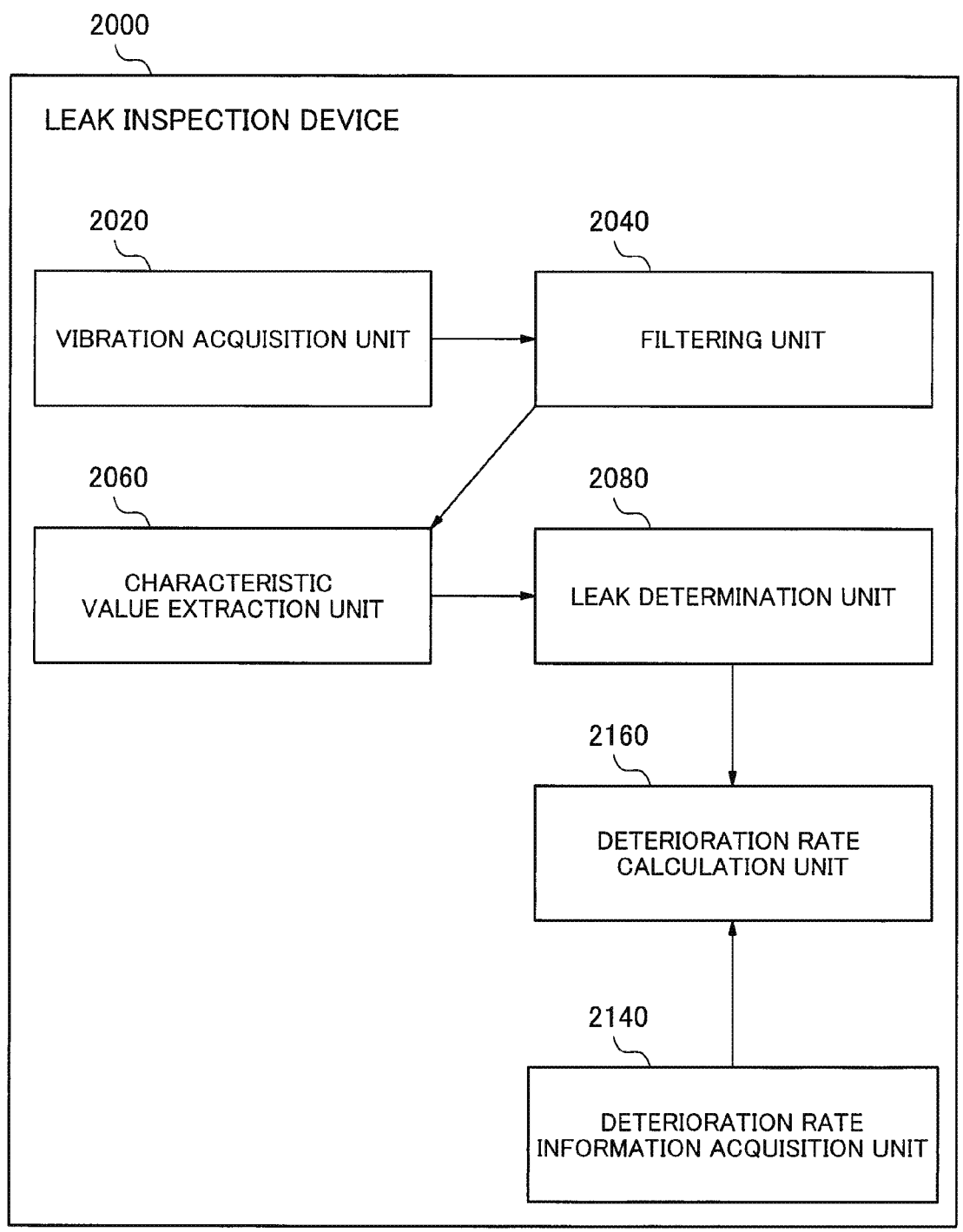
FIG. 10 is a block diagram illustrating a leak inspection device according to a third exemplary embodiment.

FIG. 10 is a block diagram illustrating a leak inspection device 2000 according to a second exemplary embodiment. Unless otherwise described, in the functional blocks illustrated in FIG. 10, the functional blocks having the same numerals as those in FIG. 1 have the same functions as the functional blocks of FIG. 1. Therefore, the description of those functional blocks will not be repeated.

Figure 11:
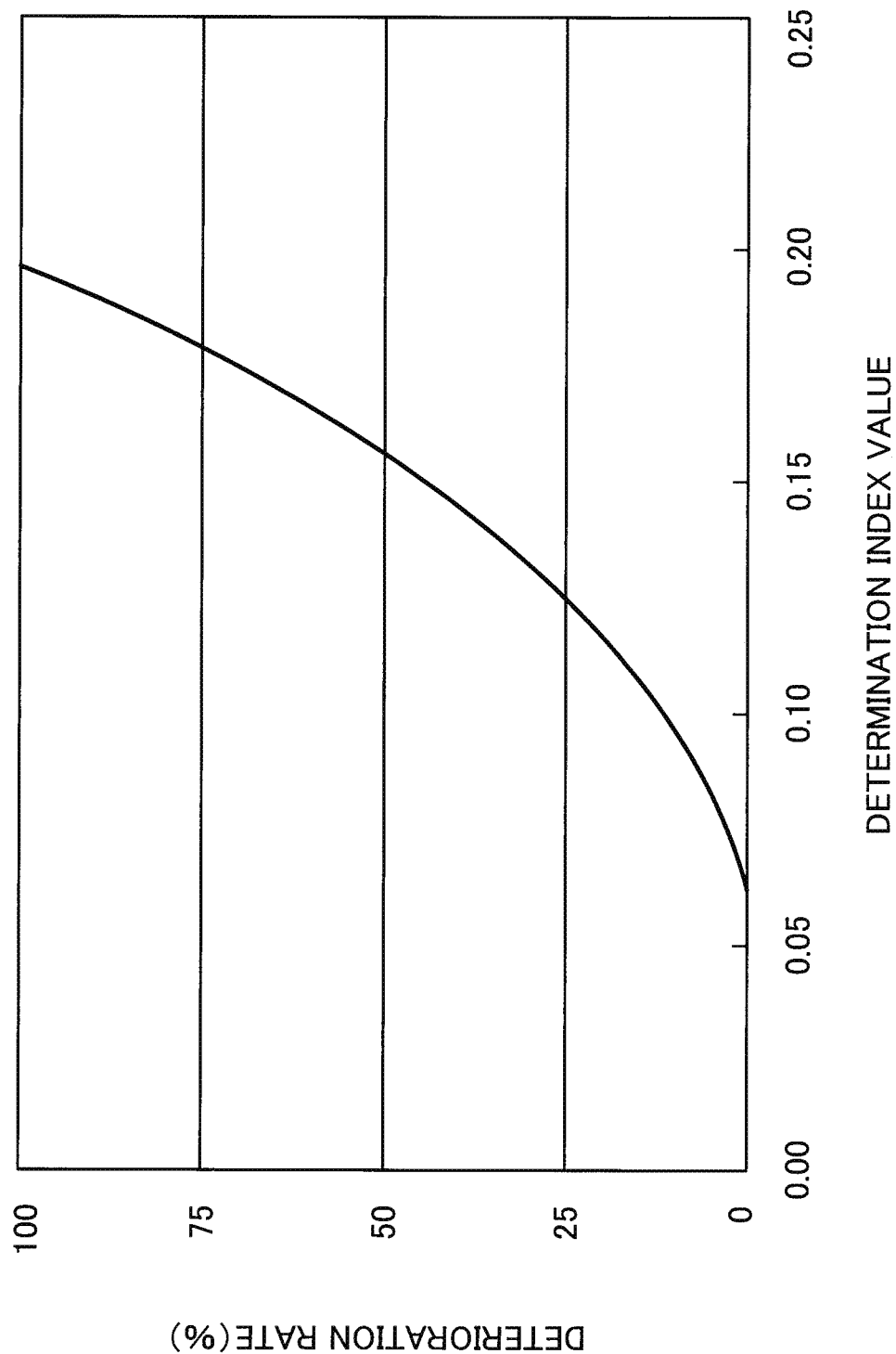
FIG. 11 is a graph illustrating a calibration curve as information example of deterioration rate information.

The leak inspection device 2000 of the exemplary embodiment further includes a deterioration rate information acquisition unit 2140 and a deterioration rate calculating unit 2160. The deterioration rate information acquisition unit 2140 obtains deterioration rate information as information indicating association between the above-described determination index value and the deterioration rate of a pipe. The deterioration rate information is, for example, information expressing a calibration curve indicating the relation between the determination index value and the deterioration rate of a pipe illustrated in FIG. 11.

Using a determination index value obtained from the leak determination unit 2080, the deterioration rate calculating unit 2160 calculates the deterioration rate of a pipe corresponding to the determination index value from deterioration rate information obtained by the deterioration rate information acquisition unit 2140.

Flow of Deterioration Rate Calculating Process

Figure 12:
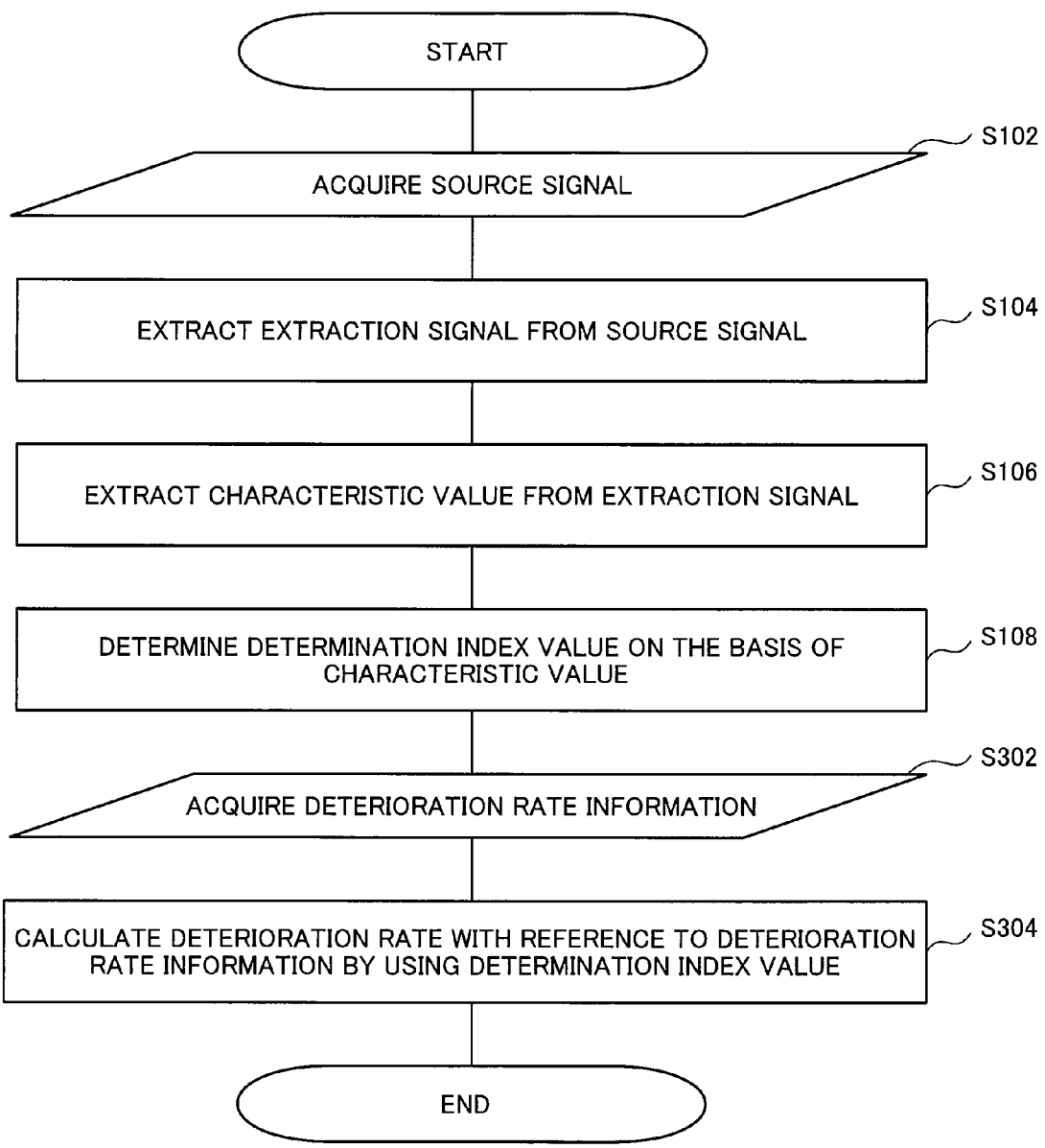
FIG. 12 is a flowchart illustrating an example of the flow of a deterioration rate calculating process performed by the leak inspection device according to the third exemplary embodiment.

FIG. 12 is a flowchart expressing an example of the flow of a leak amount calculating process by the leak inspection device 2000 of the exemplary embodiment. Steps S102 to S108 in FIG. 12 are the same processes as those in the steps S102 to S108 in FIG. 4 described in the first exemplary embodiment. Consequently, the description of the steps S102 to S108 will not be repeated.

In step S302, the deterioration rate information acquisition unit 2140 obtains deterioration rate information.

In step S304, the deterioration rate calculating unit 2160 uses a determination index value and calculates a deterioration rate corresponding to the determination index value from the deterioration rate information.

Third Modification

Figure 13:
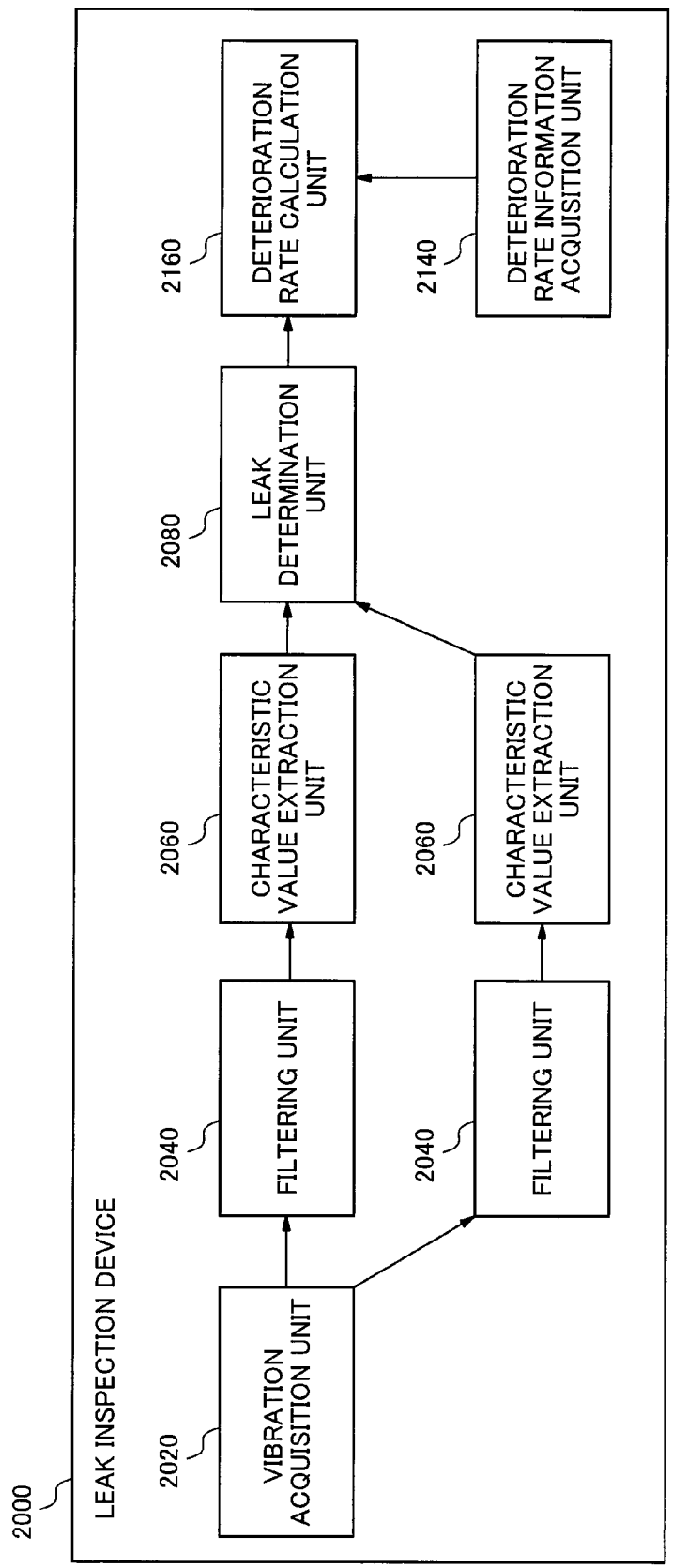
FIG. 13 is a block diagram illustrating a leak inspection device according to a third modification.

In a manner similar to the first modification, the leak inspection device 2000 of the exemplary embodiment may have a plurality of filtering units 2040 and a plurality of characteristic value extraction units 2060 (refer to FIG. 13). In this case, the deterioration rate calculating unit 2160 obtains a plurality of determination index values from the leak determination unit 2080. The deterioration rate calculating unit 2160 calculates a deterioration rate corresponding to each determination index value from deterioration rate information by using each of the obtained determination index values. The deterioration rate calculating unit 2160 determines a deterioration rate as a final calculation result on the basis of the plurality of deterioration rates calculated. For example, the deterioration rate calculating unit 2160 sets a result of performing a statistical process on a plurality of calculated leak amounts as a final calculation result. The statistical process is a process of calculating, for example, an average value, a maximum value, a minimum value, or the like.

The deterioration rate calculating unit 2160 may calculate a deterioration rate by using a part of the plurality of determination index values. For example, the deterioration rate calculating unit 2160 calculates a deterioration rate by using only determination index values each larger than a predetermined threshold used by the leak determination unit 2080 in the plurality of determination indexes. In such a manner, a deterioration rate is calculated by using only determination index values indicating the presence of a leak. Consequently, a deterioration rate can be calculated with higher precision by excluding a determination index value based on a signal in a frequency band indicating no leak from calculation of a deterioration rate.

Operation and Effect

With the configuration, according to the exemplary embodiment, the leak inspection device 2000 can calculate a deterioration rate of a pipe on the basis of a signal indicative of the magnitude of a vibration of the pipe or a the magnitude of a vibration propagating from the pipe. Consequently, the leak inspection device 2000 can provide information indicating necessity of a process on a pipe such as a repair of the pipe.

Further, in the third modification, the leak inspection device 2000 calculates a deterioration rate with respect to each of a plurality of determination index values based on extraction signals of a plurality of different frequency bands. On the basis of deterioration rates calculated from respective determination index values, a deterioration rate as a final calculation result is calculated. The leak inspection device 2000 can limit determination index values influenced by a disturbance such as domestic wastewater to a part of the determination index values by using the plurality of determination index values based on the plurality of extraction signals in different frequency bands. Consequently, the leak inspection device 2000 of the third modification can calculate a number of determination index values with high precision. Therefore, the leak inspection device 2000 can calculate a deterioration rate with high precision.

Fourth Exemplary Embodiment

Outline

Figure 14:
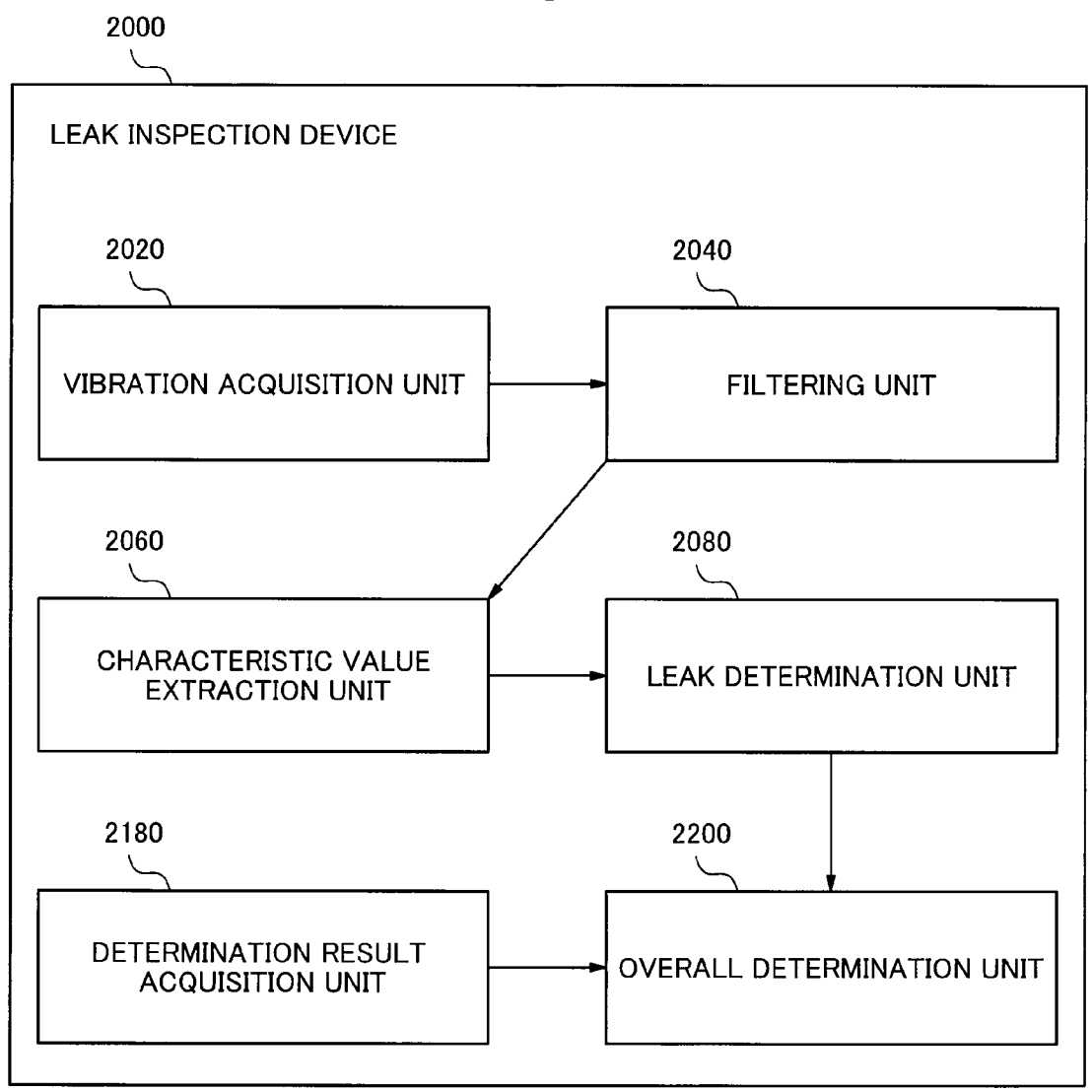
FIG. 14 is a block diagram illustrating a leak inspection device according to a fourth exemplary embodiment.

FIG. 14 is a block diagram illustrating a leak inspection device 2000 according to a third exemplary embodiment. Unless otherwise described, in the functional blocks illustrated in FIG. 14, the functional blocks having the same numerals as those in FIG. 1 have the same functions as the functional blocks of FIG. 1. Therefore, the description of those functional blocks will not be repeated.

The leak inspection device 2000 of the exemplary embodiment is used together with other leak inspection devices 2000. The leak inspection device 2000 of the exemplary embodiment further includes a determination result acquisition unit 2180 and an overall determination unit 2200. The determination result acquisition unit 2180 obtains a determination result of the presence/absence of a leak by the leak determination unit 2080 in another leak inspection device 2000. The overall determination unit 2200 determines the presence/absence of a leak as an inspection result on the basis of a determination result of the presence/absence of a leak by the leak determination unit 2080 in the leak inspection device 2000 and a determination result of the presence/absence of a leak obtained from another leak inspection device 2000 by the determination result acquisition unit 2180.

There are various methods of determining the presence/absence of a leak as an inspection result by the overall determination unit 2200. For example, the overall determination unit 2200 determines the presence of a leak as an inspection result when the presence of a leak is determined as a determination result of the presence/absence of a leak by the leak determination unit 2080 in any of the leak inspection devices 2000. Alternatively, for example, the overall determination unit 2200 determines the presence of a leak as an inspection result when the presence of a leak is determined as determination results of the presence/absence of a leak by the leak determination units 2080 in the predetermined number or larger of leak inspection devices 2000.

Flow of Inspection Result Determining Process

Figure 15:
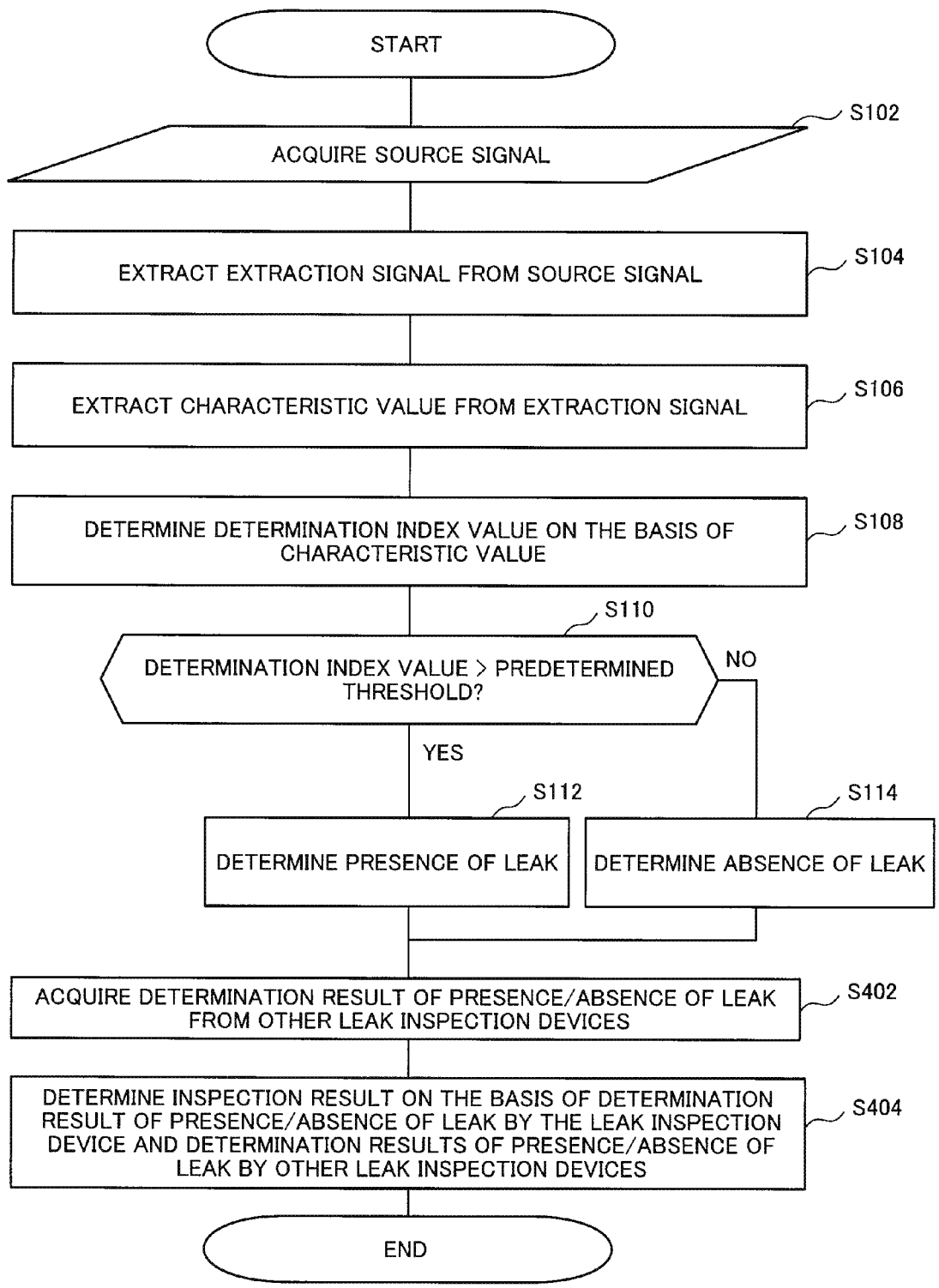
FIG. 15 is a flowchart illustrating an example of the flow of an inspection result determining process performed by the leak inspection device according to the fourth exemplary embodiment.

FIG. 15 is a flowchart expressing an example of the flow of processes for determining an inspection result by the leak inspection device 2000 of the exemplary embodiment. Steps S102 to S114 in FIG. 15 are the same as those in steps S102 to S114 in FIG. 4 described in the first exemplary embodiment. Consequently, the description of the steps S102 to S114 will not be repeated.

In step S402, the determination result acquisition unit 2180 obtains a determination result of the presence/absence of a leak by the leak determination unit 2080 in another leak inspection device 2000 from the another leak inspection device 2000.

In step S404, the overall determination unit 2200 determines the presence/absence of a leak as an inspection result on the basis of a determination result of the presence/absence of a leak by the leak determination unit 2080 in the leak inspection device 2000 and a determination result of the presence/absence of a leak obtained from another leak inspection device 2000 by the determination result acquisition unit 2180.

Fourth Modification

Figure 16:
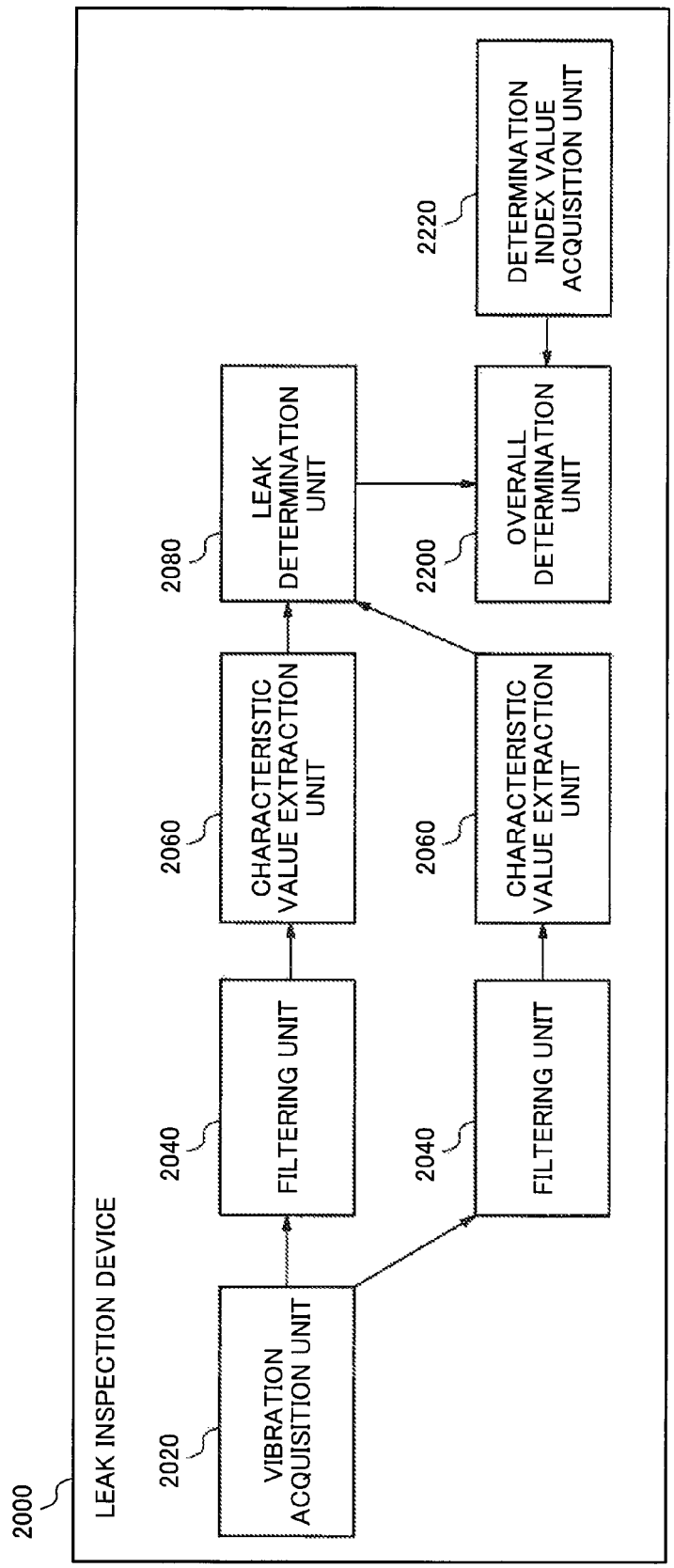
FIG. 16 is a block diagram illustrating a leak inspection device according to a fourth modification.

In a manner similar to the first modification, the leak inspection device 2000 of the exemplary embodiment may have a plurality of filtering units 2040 and a plurality of characteristic value extraction units 2060 (refer to FIG. 16). In this case, the leak inspection device 2000 has a determination index value acquisition unit 2220. The determination index value acquisition unit 2220 obtains a plurality of determination index values from the leak determination unit 2080 of another leak inspection device 2000. The overall determination unit 2200 determines the presence/absence of a leak on the basis of a plurality of determination index values obtained from the leak inspection devices 2000 and a plurality of determination index values obtained from the leak determination units 2080 of the leak inspection device 2000 of itself. Concretely, the overall determination unit 2200 determines the presence of a leak when predetermined number or more of determination index values in the plurality of determination index values based on signals in any frequency bands are larger than a predetermined threshold.

Operation and Effect

With the above-described configuration, according to the exemplary embodiment, the leak inspection device 2000 obtains a determination result of the presence/absence of a leak by the leak determination unit 2080 in another leak inspection device 2000. The leak inspection device 2000 determines the presence/absence of a leak as an inspection result on the basis of a determination result of the presence/absence of a leak by the leak determination unit 2080 of the leak inspection device 2000 itself and the determination result of the presence/absence of a leak obtained from another leak inspection device 2000 by the determination result acquisition unit 2180. By the operation, the leak inspection device 2000 of the exemplary embodiment can reduce erroneous detection caused by disturbance such as domestic wastewater.

Further, in the fourth modification, the leak inspection device 2000 determines the presence/absence of a leak as an inspection result on the basis of a plurality of determination index values obtained from another leak inspection device 2000 and a plurality of determination index values obtained from the leak determination unit 2080 of the leak inspection device 2000 itself. Concretely, the overall determination unit 2200 determines the presence of a leak when predetermined number of determination index values or more are larger than a predetermined threshold in a plurality of determination index values based on signals in any frequency band. By using a plurality of determination index values based on extraction signals in different plural frequency bands, the leak inspection device 2000 can limit determination index values influenced by disturbance such as domestic wastewater to a part of the determination index values. Consequently, the leak inspection device 2000 of the fourth modification can calculate a number of determination index values with high precision. Therefore, the leak inspection device 2000 can determine the presence/absence of a leak with high precision.

Fifth Exemplary Embodiment

Outline

Figure 17:
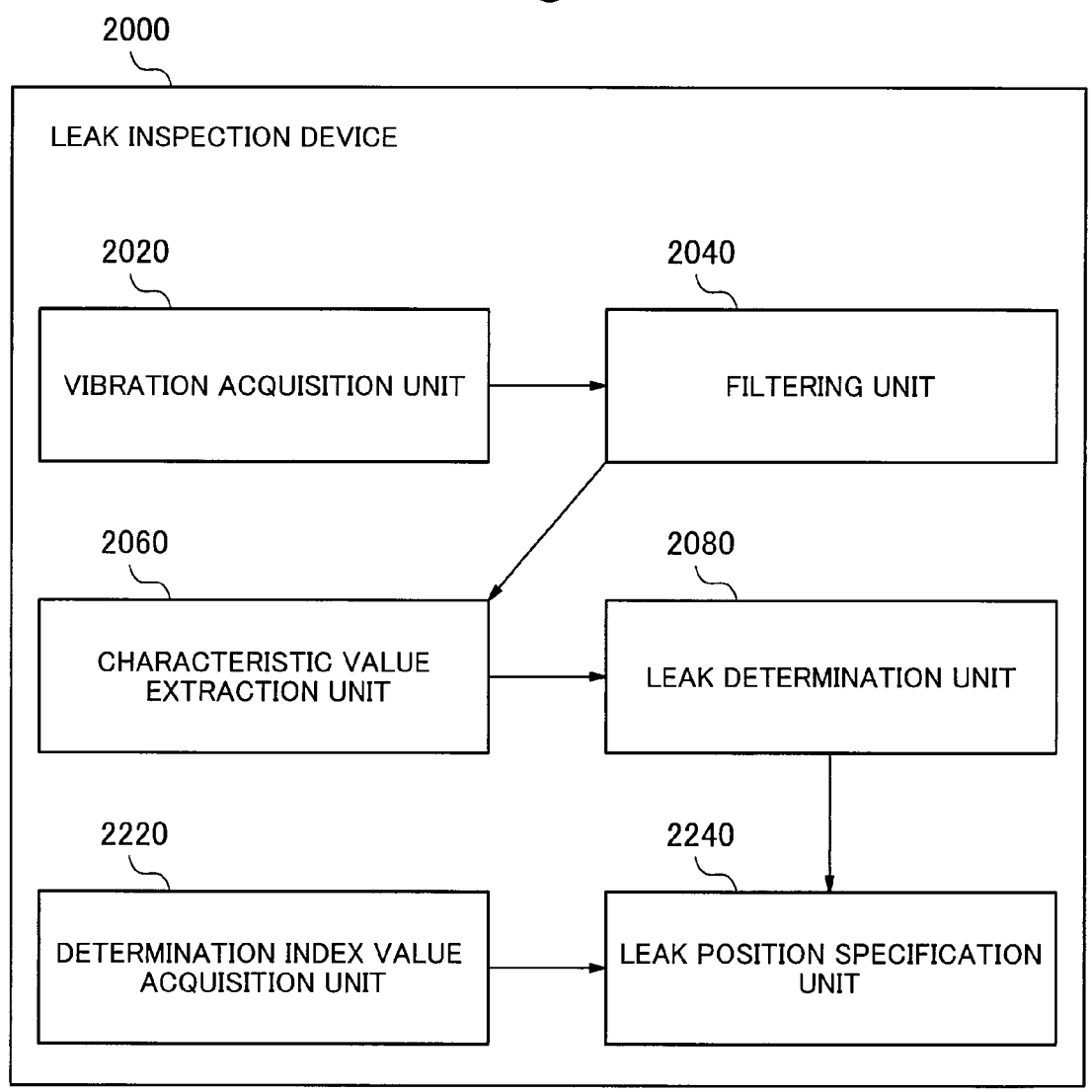
FIG. 17 is a block diagram illustrating a leak inspection device according to a fifth exemplary embodiment.

FIG. 17 is a block diagram expressing a leak inspection device 2000 according to a fifth exemplary embodiment. Unless otherwise described, in the functional blocks illustrated in FIG. 17, the functional blocks having the same numerals as those in FIG. 1 have the same functions as the functional blocks of FIG. 1. Therefore, the description of those functional blocks will not be repeated.

The leak inspection device 2000 of the exemplary embodiment is used together with another leak inspection device 2000. The leak inspection device 2000 of the exemplary embodiment has the determination index value acquisition unit 2220 and a leak position specification unit 2240. The determination index value acquisition unit 2220 obtains a determination index value determined by the leak determination unit 2080 of another leak inspection device 2000 from the another leak inspection device 2000. The leak position specification unit 2240 specifies a leak position in a pipe on the basis of the magnitude of the determination index value obtained from the another leak inspection device 2000 and the magnitude of the determination index value determined by the leak determination unit 2080 of the leak inspection device 2000 of itself. Concretely, the leak position specification unit 2240 specifies, as a leak position, a position between the installation position of the leak inspection device 2000 indicating the largest determination index value and the installation position of the leak inspection device 2000 indicating the second largest determination index value.

Figure 18:
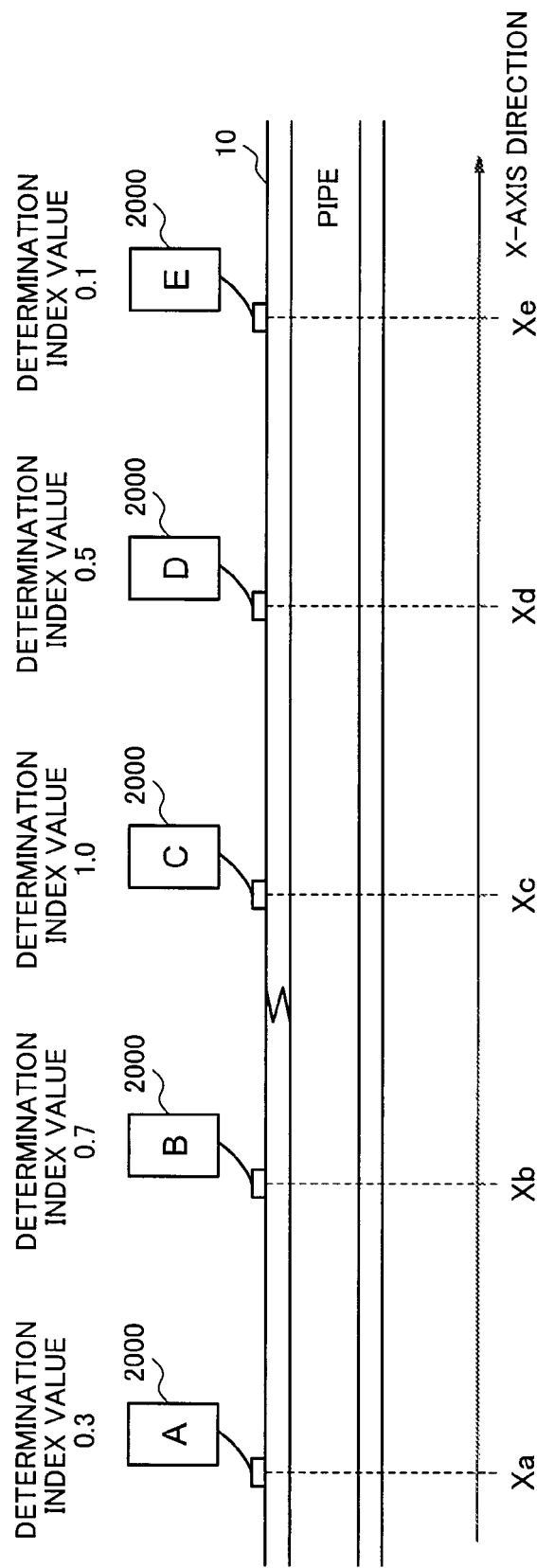
FIG. 18 is a diagram conceptually illustrating a method of specifying a leak position by the leak inspection device according to the fifth exemplary embodiment.

FIG. 18 is a diagram conceptually illustrating a method of determining a leak position by the leak inspection device

2000. In FIG. 18, a leak in a pipe 10 is inspected by five leak inspection devices 2000 (leak inspection devices A to E). In FIG. 18, the leak inspection device C indicates the largest determination index value, and the leak inspection device B indicates the second largest determination index value. Consequently, the leak inspection device 2000 of the exemplary embodiment specifies, as a leak position, a position between the leak inspection devices B and C. The leak inspection device 2000 specifying a leak position may be any of the leak inspection devices A to E.

The installation position of the leak inspection device 2000 is expressed by, for example, when setting the extension direction of a pipe is set as an X-axis direction, the X coordinate of the leak inspection device 2000. In this case, the installation positions of the leak inspection devices A to E in FIG. 18 are, for example, Xa to Xe.

Flow of Leak Position Specifying Process

Figure 19:
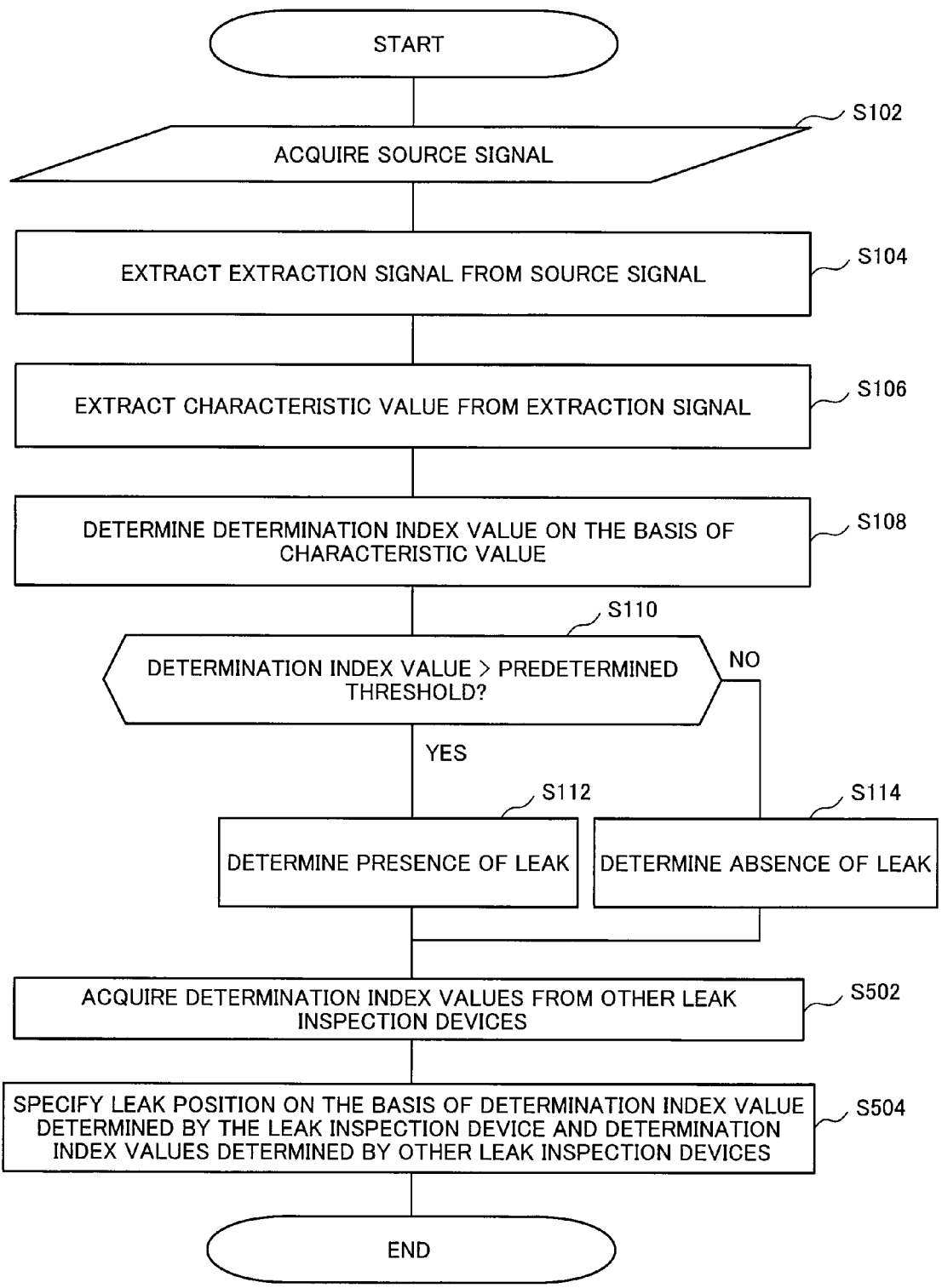
FIG. 19 is a flowchart illustrating an example of the flow of a leak position specifying process performed by the leak inspection device according to the fifth exemplary embodiment.

FIG. 19 is a flowchart illustrating an example of the flow of processes for specifying a leak position by the leak inspection device 2000 of the exemplary embodiment. In FIG. 19, steps S102 to S114 are the same processes as those of the steps S102 to S114 in FIG. 4 described in the first exemplary embodiment. Consequently, description of the steps S102 to S114 will not be repeated.

In step S502, the determination index value acquisition unit 2220 obtains a determination index value determined by another leak inspection device 2000 from the another leak inspection device 2000.

In step S504, the leak position specification unit 2240 specifies a leak position on the basis of the magnitude of a determination index value determined by the leak inspection device 2000 of itself and the magnitude of a determination index value determined by another leak inspection device 2000 obtained by the determination index value acquisition unit 2220.

Fifth Modification

Figure 20:
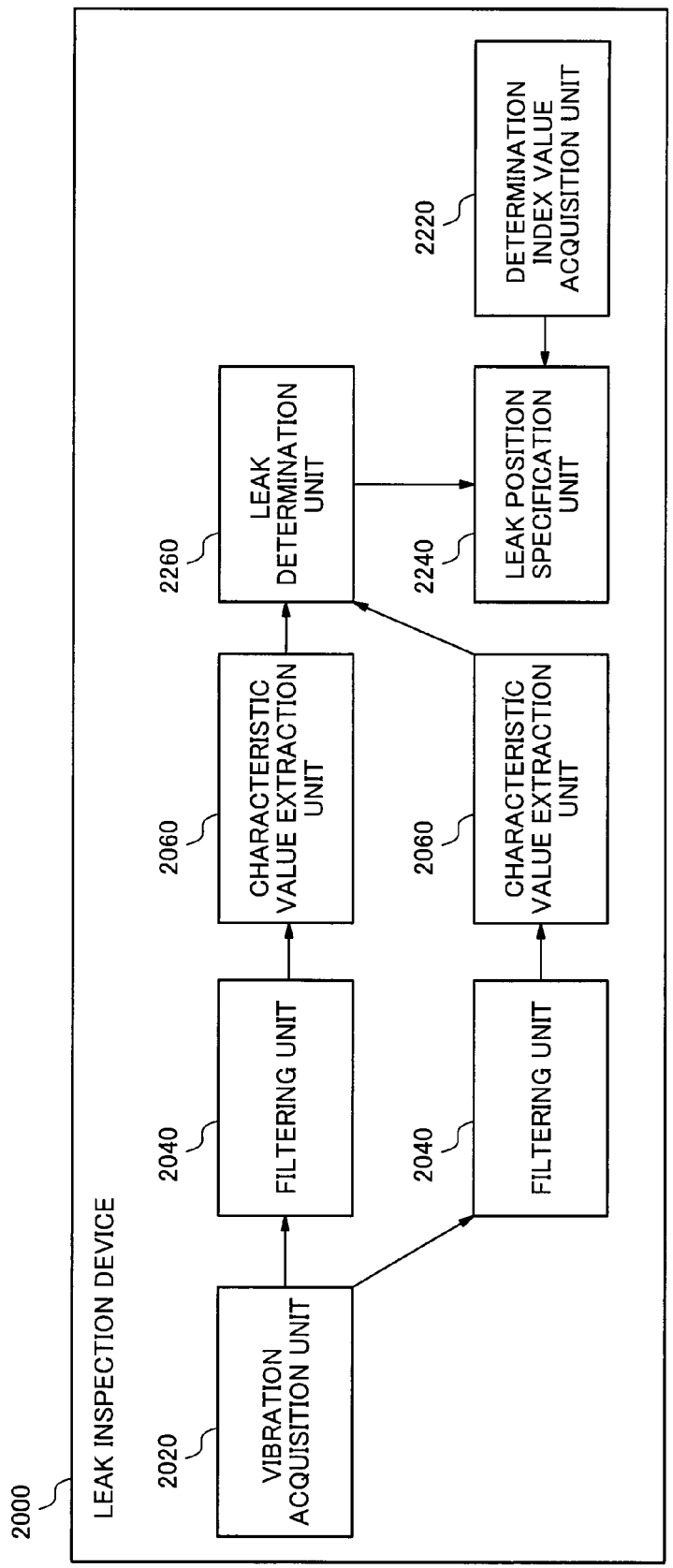
FIG. 20 is a block diagram illustrating a leak inspection device according to a fifth modification.

In a manner similar to the first modification, the leak inspection device 2000 of the exemplary embodiment may have a plurality of filtering units 2040 and a plurality of characteristic value extraction units 2060 (refer to FIG. 20). In this case, the determination index value acquisition unit 2220 obtains a plurality of determination index values from another leak inspection device 2000. The leak position specification unit 2240 specifies a leak position on the basis of a plurality of determination index values determined by the leak determination unit 2080 of the leak inspection devices 2000 of itself and a plurality of determination index values obtained from another leak inspection device 2000.

The leak position specification unit 2240 specifies the largest determination index value and the second largest determination index value in a plurality of determination index values calculated from extraction signals in any frequency band. The leak position specification unit 2240 specifies, as a leak position, a position between the installation position of the leak inspection device 2000 which is calculated the largest determination index value and the installation position of the leak inspection device 2000 which is calculated the second largest determination index value.

As described above, the leak position specification unit 2240 specifies a leak position by using determination index values based on extraction signals in any frequency band. The leak position specification unit 2240 determines a determination index value based on an extraction signal in a frequency band to specify a leak position as follows. First, the leak position specification unit 2240 specifies the largest determination index value from all of determination index values. Next, the leak position specification unit 2240 specifies an extraction signal of a frequency band based on which the determination index value is calculated. The leak position specification unit 2240 specifies a leak position by using determination index values each determined on the basis of the extraction signal in the frequency band specified.

Operation and Effect

With the above-described configuration, according to the exemplary embodiment, the leak inspection device 2000 can specify a leak position in a pipe by comparing magnitudes of determination index values determined by the leak inspection device 2000 itself and other leak inspection devices 2000. Consequently, the leak inspection device 2000 can provide information indicating a leak position in a pipe. For example, by obtaining information indicating a leak position in a pipe to be repaired, the user of the leak inspection device 2000 can repair the pipe promptly.

Further, in the fifth modification, the leak inspection device 2000 specifies a leak position on the basis of determination index values determined on the basis of extraction signals in different plural frequency bands. By using the plurality of determination index values based on the extraction signals in the different plural frequency bands, the leak inspection device 2000 can limit determination index values influenced by disturbance such as domestic wastewater to a part of the determination index values. Consequently, the leak inspection device 2000 of the fifth modification can calculate a number of determination index values with high precision. Therefore, the leak inspection device 2000 of the fifth modification can specify a leak position with high precision.

Although the exemplary embodiments and modifications of the present invention have been described above with reference to the drawings, they are examples of the present invention. Combinations of the foregoing exemplary embodiments and modifications and various configurations other than the foregoing exemplary embodiments and modifications can be also employed.

Hereinbelow, examples of reference modes will be supplementarily described.

1. A leak inspection device having:

vibration acquisition means for acquiring a signal indicating a magnitude of a vibration of a pipe or a magnitude of a vibration propagating from a pipe in chronological order;

filtering means for extracting, from the signal, a signal in one frequency band;

characteristic value extracting means for dividing the extracted signal at predetermined time intervals, calculating an absolute value of each of a plurality of extreme values of magnitude of the vibration for each of the divided signals, performing a statistical process on the plurality of calculated absolute values for each of the divided signals, and extracting a value calculated by the statistical process as a characteristic value; and leak determining means for determining the presence of a leak as an inspection result when a determination index value determined by using the characteristic value is larger than a predetermined threshold.

2. The leak inspection device described in 1, wherein the characteristic value extracting means performs a process of calculating a minimum value of the plurality of absolute values as the statistical process.

3. The leak inspection device described in 1 or 2, wherein the leak determining means uses the characteristic value as the determination index value.

4. The leak inspection device described in 1 or 2, further having characteristic value history storing means for storing history of the characteristic values,
wherein the leak determining means calculates characteristic value acceleration indicating the degree of increase in the characteristic value by using the characteristic value extracted by the characteristic value extracting means and the characteristic value in the past which is stored in the characteristic value history storing means, and sets the calculated characteristic value acceleration as the determination index value.

5. The leak inspection device described in 1 or 2, further having characteristic value history storing means for storing history of the characteristic values,
wherein the leak determining means calculates characteristic value acceleration indicating the degree of increase in the characteristic value by using the characteristic value extracted by the characteristic value extracting means and the characteristic value in the past which is stored in the characteristic value history storing means,
calculates past characteristic value acceleration indicating the degree of increase in the past of the characteristic value by using the characteristic value in the past which is stored in the characteristic value history storing means and the characteristic value stored in the characteristic value history storing means prior to the characteristic value in the past, and
determines the determination index value on the basis of a value obtained by adding the characteristic value acceleration and the past characteristic value acceleration.

6. The leak inspection device described in any one of 1 to 5, further having:
leak amount information acquiring means for acquiring leak amount information indicating correspondence between the determination index value and a leak amount of a pipe; and
leak amount calculating means for referring to the leak amount information by using a determination index value obtained from the leak determining means and calculating a leak amount of a pipe on the basis of the reference result.

7. The leak inspection device described in any one of 1 to 6, further having:
deterioration rate information acquiring means for acquiring deterioration rate information as information indicating correspondence between the determination index value and a deterioration rate of a pipe; and
deterioration rate calculating means for referring to the deterioration rate information by using a determination index value acquired from the leak determining means and calculating a deterioration rate of a pipe on the basis of the reference result.

8. The leak inspection device described in any one of 1 to 7, further having:
determination result acquiring means for acquiring a determination result by leak determining means of other leak inspection devices; and
overall determining means for determining presence of a leak as an inspection result when presence of a leak is determined in predetermined number or more of leak inspection devices, in the present leak inspection device and the other leak inspection devices.

9. The leak inspection device described in any one of 1 to 8, further having leak position specifying means for acquiring the determination index values from the other plural leak inspection devices and specifying, as a leak position, a position between an installation position of a leak inspection device indicating a largest determination index value and an installation position of a leak inspection device indicating a second largest determination index value, in the present leak inspection device and the plurality of leak inspection devices.

10. The leak inspection device described in any one of 1 to 3, further having:
the plurality of filtering means for extracting signals in different frequency bands; and
the plurality of characteristic value extracting means for extracting the characteristic values from the signals extracted by the different filtering means,
wherein the leak determining means acquires the characteristic values from the plurality of characteristic value extracting means, determines the determination index value for each of the characteristic values, compares the determination index value with a predetermined threshold and, when any determination index value is larger than the predetermined threshold, determines the presence of a leak as an inspection result.

11. The leak inspection device described in 10, further having characteristic value history storing means for storing history of the characteristic values extracted by the characteristic value extracting means,
wherein the leak determining means calculates, for each of the characteristic values, characteristic value acceleration indicating the degree of increase of the characteristic value by using the present characteristic value and a characteristic value stored in the characteristic value history storing means and extracted in the past by the characteristic value extracting means which extracted the present characteristic value, and sets each of the characteristic value accelerations as the determination index value.

12. The leak inspection device described in 11, wherein the leak determining means calculates, for each of the characteristic values, past characteristic value acceleration indicating the degree of increase in the past of the characteristic value by using the characteristic value in the past which is stored in the characteristic value storing means by the characteristic value extracting means which extracted the present characteristic value and the characteristic value stored in the characteristic value history storing means prior to the characteristic value in the past by the characteristic value extracting means,
determines addition characteristic value acceleration on the basis of a value obtained by adding the characteristic value acceleration and the past characteristic value acceleration, and sets each of the addition characteristic value accelerations as the determination index value.

13. The leak inspection device described in any one of 10 to 12, further having:
leak amount information acquiring means for acquiring leak amount information indicating correspondence between the determination index value and a leak amount of a pipe; and
leak amount calculating means for acquiring each of leak amounts based on the determination index values from the leak amount information by using each of the determination index values and setting a statistical value of the plurality of acquired leak amounts as a leak amount of the pipe.

14. The leak inspection device described in any one of 10 to 13, further having:
deterioration rate information acquiring means for acquiring deterioration rate information indicating correspondence between the determination index value and a deterioration rate of a pipe; and
deterioration rate calculating means for acquiring a deterioration rate based on each of the determination index values from the deterioration rate information by using each of the determination index values and setting a statistical value of the plurality of acquired deterioration rates as a deterioration rate of the pipe.

15. The leak inspection device described in any one of 10 to 14, further having:
   determination index value acquiring means for acquiring the determination index value from a plurality of other leak inspection devices; and
   overall determining means for determining presence of a leak as an inspection result by the present leak inspection device when predetermined number or more of the determination index values in the plurality of determination index values based on signals in any frequency band are larger than the predetermined threshold.

16. The leak inspection device described in any one of 10 to 14, further having:
   determination index value acquiring means for acquiring the determination index value from a plurality of other leak inspection devices; and
   leak position specifying means for specifying, as a first determination index value, a largest determination index value from a determination index value determined by the present leak inspection device and determination index values acquired from other leak inspection devices, specifying, as a second determination index value, a largest determination index value from the other determination index values determined on the basis of signals in the same frequency band as that of the first determination index value, and specifying, as a leak position, a position between an installation position of a leak inspection device which determined the first determination index value and an installation position of a leak inspection device which determined the second determination index value.

17. The leak inspection device described in 15, further having leak position specifying means for specifying, as a first determination index value, a largest determination index value from determination index values acquired by the determination index value acquiring means, specifying, as a second determination index value, a largest determination index value from the other determination index values determined on the basis of signals in the same frequency band as that of the first determination index value, and specifying, as a leak position, a position between an installation position of a leak inspection device which determined the first determination index value and an installation position of a leak inspection device which determined the second determination index value.

18. A leak inspection program making a computer have a function of operating as a leak inspection device for performing a pipe leak inspection, and making the computer have:
   a vibration acquiring function of acquiring a signal indicating a magnitude of a vibration of a pipe or a magnitude of a vibration propagating from a pipe in chronological order;
   a filtering function of extracting, from the signal, a signal in one frequency band;
   a characteristic value extracting function of dividing the extracted signal at predetermined time intervals, calculating an absolute value of each of a plurality of extreme values of magnitude of the vibration for each of the divided signals, performing a statistical process on the plurality of calculated absolute values for each of the divided signals, and extracting a value calculated by the statistical process as a characteristic value; and
   a leak determining function of determining the presence of a leak as an inspection result when a determination index value determined by using the characteristic value is larger than a predetermined threshold.

19. The leak inspection program described in 18, wherein the characteristic value extracting function performs a process of calculating a minimum value of the plurality of absolute values as the statistical process.

20. The leak inspection program described in 18 or 19, wherein the leak determining function sets the characteristic value as the determination index value.

21. The leak inspection program described in 18 or 19, further making the computer have a characteristic value history storing function of storing history of the characteristic value,
   wherein the leak determining function calculates characteristic value acceleration indicating the degree of increase in the characteristic value by using the characteristic value extracted by the characteristic value extracting function and the characteristic value in the past which is stored by the characteristic value history storing function, and sets the calculated characteristic value acceleration as the determination index value.

22. The leak inspection program described in 18 or 19, further making the computer have a characteristic value history storing function of storing history of the characteristic value,
   wherein the leak determining function calculates characteristic value acceleration indicating the degree of increase of the characteristic value by using the characteristic value extracted by the characteristic value extracting function and the past characteristic value stored by the characteristic value history storing function,
   calculates past characteristic value acceleration indicating the degree of increase in the past of the characteristic value by using the characteristic value in the past which is stored by the characteristic value history storing function and the characteristic value stored in the characteristic value history storing means prior to the characteristic value in the past, and
   determines the determination index value on the basis of a value obtained by adding the characteristic value acceleration and the past characteristic value acceleration.

23. The leak inspection program described in any one of 18 to 22, further making the computer have:
   a leak amount information acquiring function of acquiring leak amount information indicating correspondence between the determination index value and a leak amount of a pipe; and
   a leak amount calculating function of referring to the leak amount information by using a determination index value acquired by the leak determining function and calculating a leak amount of a pipe on the basis of the reference result.

24. The leak inspection program described in any one of 18 to 23, further making the computer have:
   a deterioration rate information acquiring function of acquiring deterioration rate information as information indicating correspondence between the determination index value and a deterioration rate of a pipe; and
   a deterioration rate calculating function of referring to the deterioration rate information by using a determination index value acquired by the leak determining function and calculating a deterioration rate of a pipe on the basis of the reference result.

25. The leak inspection program described in any one of 18 to 24, further making the computer have:
a determination result acquiring function of acquiring a determination result by leak determining functions of other leak inspection devices; and
an overall determining function of determining presence of a leak as an inspection result when presence of a leak is determined in predetermined number or more of leak inspection devices, in the present leak inspection device and other leak inspection devices.

26. The leak inspection program described in any one of 18 to 25, further making the computer have a leak position specifying function of acquiring the determination index values from the other plural leak inspection devices and specifying, as a leak position, a position between an installation position of a leak inspection device indicating a largest determination index value and an installation position of a leak inspection device indicating a second largest determination index value, in the present leak inspection device and the plurality of leak inspection devices.

27. The leak inspection program described in any one of 18 to 20, further making the computer have:
the plurality of filtering functions of extracting signals in different frequency bands; and
the plurality of characteristic value extracting functions of extracting the characteristic values from the signals extracted by the different filtering means,
wherein the leak determining function acquires the characteristic values from the plurality of characteristic value extracting functions, determines the determination index value for each of the characteristic values, compares the determination index value with a predetermined threshold and, when any determination index value is larger than the predetermined threshold, determines the presence of a leak as an inspection result.

28. The leak inspection program described in 27, further making the computer have a characteristic value history storing function of storing history of the characteristic values extracted by the characteristic value extracting functions,
wherein the leak determining function calculates, for each of the characteristic values, characteristic value acceleration indicating the degree of increase of the characteristic value by using the present characteristic value and a characteristic value stored by the characteristic value history storing function and extracted in the past by the characteristic value extracting function which extracted the present characteristic value, and sets each of the characteristic value accelerations as the determination index value.

29. The leak inspection program described in 28, wherein the leak determining function calculates, for each of the characteristic values, past characteristic value acceleration indicating the degree of increase in the past of the characteristic value by using the characteristic value in the past which is extracted by the characteristic value extracting function and is stored by the characteristic value storing function, and the characteristic value stored by the characteristic value history storing function prior to the characteristic value in the past by the characteristic value extracting function,
determines addition characteristic value acceleration on the basis of a value obtained by adding the characteristic value acceleration and the past characteristic value acceleration, and sets each of the addition characteristic value accelerations as the determination index value.

30. The leak inspection program described in any one of 27 to 29, further making the computer have:
a leak amount information acquiring function of acquiring leak amount information indicating correspondence between the determination index value and a leak amount of a pipe; and
a leak amount calculating function of acquiring each of leak amounts based on the determination index values from the leak amount information by using each of the determination index values and setting a statistical value of the plurality of acquired leak amounts as a leak amount of the pipe.

31. The leak inspection program described in any one of 27 to 30, further making the computer have:
a deterioration rate information acquiring function of acquiring deterioration rate information indicating correspondence between the determination index value and a deterioration rate of a pipe; and
a deterioration rate calculating function of acquiring a deterioration rate based on each of the determination index values from the deterioration rate information by using each of the determination index values and setting a statistical value of the plurality of acquired deterioration rates as a deterioration rate of the pipe.

32. The leak inspection device described in any one of 27 to 31, further making the computer have:
a determination index value acquiring function of acquiring the determination index value from a plurality of other leak inspection devices; and
an overall determining function of determining presence of a leak as an inspection result by the present leak inspection device when predetermined number or more of the determination index values in the plurality of determination index values based on signals in any frequency band are larger than the predetermined threshold.

33. The leak inspection program described in any one of 27 to 31, further making the computer have:
a determination index value acquiring function of acquiring the determination index value from a plurality of other leak inspection devices; and
a leak position specifying function of specifying, as a first determination index value, a largest determination index value from a determination index value determined by the present leak inspection device and determination index values acquired from other leak inspection devices, specifying, as a second determination index value, a largest determination index value from the other determination index values determined on the basis of signals in the same frequency band as that of the first determination index value, and specifying, as a leak position, a position between an installation position of a leak inspection device which determined the first determination index value and an installation position of a leak inspection device which determined the second determination index value.

34. The leak inspection program described in 32, further making the computer have a leak position specifying function of specifying, as a first determination index value, a largest determination index value from determination index values acquired by the determination index value acquiring function, specifying, as a second determination index value, a largest determination index value from the other determination index values determined on the basis of signals in the same frequency band as that of the first determination index value, and specifying, as a leak position, a position between an installation position of a leak inspection device which determined the first determination index value and an installation position of a leak inspection device which determined the second determination index value.

35. A method of inspecting a leak in a pipe, executed by a computer, having:
   a vibration acquiring step of acquiring a signal indicating magnitudes of vibrations of a pipe or magnitudes of vibrations propagating from a pipe in chronological order;
   a filtering step of extracting, from the signal, a signal in one frequency band;
   a characteristic value extracting step of dividing the extracted signal at predetermined time intervals, calculating an absolute value of each of a plurality of extreme values of magnitude of the vibration for each of the divided signals, performing a statistical process on the plurality of calculated absolute values for each of the divided signals, and extracting a value calculated by the statistical process as a characteristic value; and
   a leak determining step of determining the presence of a leak as an inspection result when a determination index value determined by using the characteristic value is larger than a predetermined threshold.

36. The leak inspection method described in 35, wherein in the characteristic value extracting step, a minimum value of the plurality of absolute values is calculated as the statistical process.

37. The leak inspection method described in 35 or 36, wherein in the leak determining step, the characteristic value is set as the determination index value.

38. The leak inspection method described in 35 or 36, further including a characteristic value history storing step of storing history of the characteristic value,
   wherein in the leak determining step, characteristic value acceleration indicating the degree of increase in the characteristic value is calculated by using the characteristic value extracted in the characteristic value extracting step and the characteristic value in the past which is stored in the characteristic value history storing step, and the calculated characteristic value acceleration is set as the determination index value.

39. The leak inspection method described in 35 or 36, further including a characteristic value history storing step of storing history of the characteristic value,
   wherein in the leak determining step, characteristic value acceleration indicating the degree of increase of the characteristic value is calculated by using the characteristic value extracted in the characteristic value extracting step and the past characteristic value stored in the characteristic value history storing step,
   past characteristic value acceleration indicating the degree of increase in the past of the characteristic value is calculated by using the characteristic value in the past which is stored in the characteristic value history storing step and the characteristic value stored in the characteristic value history storing step prior to the characteristic value in the past, and
   the determination index value is determined on the basis of a value obtained by adding the characteristic value acceleration and the past characteristic value acceleration.

40. The leak inspection method described in any one of 35 to 39, further including:
   a leak amount information acquiring step of acquiring leak amount information indicating correspondence between the determination index value and a leak amount of a pipe; and
   a leak amount calculating step of referring to the leak amount information by using a determination index value acquired in the leak determining step and calculating a leak amount of a pipe on the basis of the reference result.

41. The leak inspection method described in any one of 35 to 40, further including:
   a deterioration rate information acquiring step of acquiring deterioration rate information as information indicating correspondence between the determination index value and a deterioration rate of a pipe; and
   a deterioration rate calculating step of referring to the deterioration rate information by using a determination index value acquired in the leak determining step and calculating a deterioration rate of a pipe on the basis of the reference result.

42. The leak inspection method described in any one of 35 to 41, further including:
   a determination result acquiring step of acquiring a determination result in leak determining steps of other leak inspection devices; and
   an overall determining step of determining presence of a leak as an inspection result when presence of a leak is determined in predetermined number or more of leak inspection devices, in the present leak inspection device and other leak inspection devices.

43. The leak inspection method described in any one of 35 to 42, further including a leak position specifying step of acquiring the determination index values from the other plural leak inspection devices and specifying, as a leak position, a position between an installation position of a leak inspection device indicating a largest determination index value and an installation position of a leak inspection device indicating a second largest determination index value, in the present leak inspection device and the plurality of leak inspection devices.

44. The leak inspection method described in any one of 35 to 37, further including:
   the plurality of filtering steps of extracting signals in different frequency bands; and
   the plurality of characteristic value extracting step of extracting the characteristic values from the signals extracted by the different filtering means,
   wherein in the leak determining step, the characteristic values are acquired from the plurality of characteristic value extracting steps, the determination index value is determined for each of the characteristic values, the determination index value is compared with a predetermined threshold and, when any determination index value is larger than the predetermined threshold, the presence of a leak is determined as an inspection result.

45. The leak inspection method described in 44, including a characteristic value history storing step of storing history of the characteristic values extracted in the characteristic value extracting steps,
   wherein in the leak determining step, for each of the characteristic values, characteristic value acceleration indicating the degree of increase of the characteristic value is calculated by using the present characteristic value and a characteristic value stored in the characteristic value history storing step and extracted in the past in the characteristic value extracting step in which the present characteristic value is extracted, and each of the characteristic value accelerations is set as the determination index value.

46. The leak inspection method described in 45, wherein in the leak determining step, for each of the characteristic values, past characteristic value acceleration indicating the degree of increase in the past of the characteristic value is calculated by using the characteristic value in the past which is extracted in the characteristic value extracting step and is stored in the characteristic value storing step, and the characteristic value stored in the characteristic value history storing step prior to the characteristic value in the past in the characteristic value extracting step, addition characteristic value acceleration is determined on the basis of a value obtained by adding the characteristic value acceleration and the past characteristic value acceleration, and each of the addition characteristic value accelerations is set as the determination index value.

47. The leak inspection program described in any one of 44 to 46, further including:
a leak amount information acquiring step of acquiring leak amount information indicating correspondence between the determination index value and a leak amount of a pipe; and
a leak amount calculating step of acquiring each of leak amounts based on the determination index values from the leak amount information by using each of the determination index values and setting a statistical value of the plurality of acquired leak amounts as a leak amount of the pipe.

48. The leak inspection method described in any one of 44 to 47, further including:
a deterioration rate information acquiring step of acquiring deterioration rate information indicating correspondence between the determination index value and a deterioration rate of a pipe; and
a deterioration rate calculating step of acquiring a deterioration rate based on each of the determination index values from the deterioration rate information by using each of the determination index values and setting a statistical value of the plurality of acquired deterioration rates as a deterioration rate of the pipe.

49. The leak inspection method described in any one of 44 to 48, further including:
a determination index value acquiring step of acquiring the determination index value from a plurality of other leak inspection devices; and
an overall determining step of determining presence of a leak as an inspection result by the present leak inspection device when predetermined number or more of the determination index values in the plurality of determination index values based on signals in any frequency band are larger than the predetermined threshold.

50. The leak inspection method described in any one of 44 to 48, further including:
a determination index value acquiring step of acquiring the determination index value from a plurality of other leak inspection devices; and
a leak position specifying step of specifying, as a first determination index value, a largest determination index value from a determination index value determined by the present leak inspection device and determination index values acquired from other leak inspection devices, specifying, as a second determination index value, a largest determination index value from the other determination index values determined on the basis of signals in the same frequency band as that of the first determination index value, and specifying, as a leak position, a position between an installation position of a leak inspection device which determined the first determination index value and an installation position of a leak inspection device which determined the second determination index value.

51. The leak inspection method described in 49, further including a leak position specifying step of specifying, as a first determination index value, a largest determination index value from determination index values acquired in the determination index value acquiring step, specifying, as a second determination index value, a largest determination index value from the other determination index values determined on the basis of signals in the same frequency band as that of the first determination index value, and specifying, as a leak position, a position between an installation position of a leak inspection device which determined the first determination index value and an installation position of a leak inspection device which determined the second determination index value.

The present application claims for priority based on Japanese Patent Application No. 2012-214811 filed on Sep. 27, 2012 and all of its disclosure is incorporated herein.

What is claimed is:

1. A leak inspection device comprising:
a vibration acquisition unit that acquires a signal indicating a vibration of a pipe or a vibration propagating from a pipe;
a filtering unit that extracts, from the signal, a signal in one frequency band;
a characteristic value extracting unit that divides the extracted signal at predetermined time intervals, calculates an absolute value for each of a plurality of extreme values of level of the signal for each of the divided signals, and calculates a characteristic value by performing a statistical process on the plurality of absolute values;
a leak determining unit that calculates a determination index value by using the characteristic value, and determines presence of a leak on the pipe by determining that the determination index value is larger than a predetermined threshold; and
leak position specifying unit that acquires the determination index values from other plural leak inspection devices and specifies, as a leak position, a position between an installation position of a leak inspection device indicating a largest determination index value and an installation position of a leak inspection device indicating a second largest determination index value in a present leak inspection device and the plurality of leak inspection devices.

2. The leak inspection device according to claim 1, wherein the characteristic value extracting unit performs a process of calculating a minimum value of the plurality of absolute values as the statistical process.

3. The leak inspection device according to claim 1, wherein the leak determining unit uses the characteristic value as the determination index value.

4. The leak inspection device according to claim 1, further comprising:
a characteristic value history storing unit that stores a history of characteristic values,
wherein the leak determining unit calculates a characteristic value acceleration indicating a degree of increase in the characteristic value by using the characteristic value extracted by the characteristic value extracting unit and a characteristic value in the past which is stored in the characteristic value history storing unit, and sets the calculated characteristic value acceleration as the determination index value.

5. The leak inspection device according to claim 1, further comprising:
a characteristic value history storing unit that stores a history of characteristic values,
wherein the leak determining unit calculates a characteristic value acceleration indicating a degree of increase in the characteristic value by using the characteristic value extracted by the characteristic value extracting unit and a characteristic value in the past which is stored in the characteristic value history storing unit,
calculates a past characteristic value acceleration indicating a degree of increase in the past of the characteristic value by using a characteristic value in the past which is stored in the characteristic value history storing unit and the characteristic value stored in the characteristic value history storing unit prior to the characteristic value in the past, and
determines the determination index value on a basis of a value obtained by adding the characteristic value acceleration and the past characteristic value acceleration.

6. The leak inspection device according to claim 1, further comprising:
a leak amount information acquiring unit that acquires leak amount information indicating correspondence between the determination index value and a leak amount of a pipe; and
a leak amount calculating unit that refers to the leak amount information by using a determination index value obtained from the leak determining unit and calculates a leak amount of a pipe on a basis of a reference result.

7. The leak inspection device according to claim 1, further comprising:
a deterioration rate information acquiring unit that acquires deterioration rate information as information indicating a correspondence between the determination index value and a deterioration rate of a pipe; and
a deterioration rate calculating unit that refers to the deterioration rate information by using a determination index value acquired from the leak determining unit and calculates a deterioration rate of a pipe on a basis of the reference result.

8. The leak inspection device according to claim 1, further comprising:
a determination result acquiring unit that acquires a determination result by leak determining unit of other leak inspection devices; and
an overall determining unit that determines presence of a leak as an inspection result by determining presence of a leak is in a predetermined number or more of leak inspection devices, in the present leak inspection device and the other leak inspection devices.

9. The leak inspection device according to claim 1, further comprising:
a plurality of filtering units that extract signals in different frequency bands; and
a plurality of characteristic value extracting means that extract the characteristic values from the signals extracted by a different filtering unit,
wherein the leak determining unit acquires the characteristic values from a plurality of characteristic value extracting units, determines the determination index value for each of the characteristic values, compares the determination index value with a predetermined threshold and, by determining that any determination index value is larger than the predetermined threshold, determines the presence of a leak as an inspection result.

10. The leak inspection device according to claim 9, further comprising:
a characteristic value history storing unit that stores a history of the characteristic values,
wherein the leak determining unit calculates, for each of the characteristic values, a characteristic value acceleration indicating a degree of increase of a characteristic value by using a present characteristic value and a characteristic value stored in the characteristic value history storing unit and extracted in the past by the characteristic value extracting unit which extracted the present characteristic value, and sets each of the characteristic value accelerations as the determination index value.

11. The leak inspection device according to claim 10, wherein the leak determining unit calculates, for each of the characteristic values, a past characteristic value acceleration indicating a degree of increase in the past of the characteristic value by using the characteristic value in the past which is stored in the characteristic value storing unit by the characteristic value extracting unit which extracted the present characteristic value and the characteristic value stored in the characteristic value history storing unit prior to the characteristic value in the past by the characteristic value extracting unit,
determines an addition characteristic value acceleration on a basis of a value obtained by adding the characteristic value acceleration and a past characteristic value acceleration, and sets each of the addition characteristic value accelerations as the determination index value.

12. The leak inspection device according to claim 9, comprising:
a leak amount information acquiring unit that acquires leak amount information indicating correspondence between the determination index value and a leak amount of a pipe; and
a leak amount calculating unit that acquires each of leak amounts based on the determination index values from the leak amount information by using each of the determination index values and sets a statistical value of the plurality of acquired leak amounts as a leak amount of the pipe.

13. The leak inspection device according to claim 9, comprising:
a deterioration rate information acquiring unit that acquires deterioration rate information indicating correspondence between the determination index value and a deterioration rate of a pipe; and
a deterioration rate calculating unit that acquires a deterioration rate based on each of the determination index values from the deterioration rate information by using the determination index values and sets a statistical value of the plurality of acquired deterioration rates as a deterioration rate of the pipe.

14. The leak inspection device according to claim 9, further comprising:
a determination index value acquiring unit that acquires the determination index value from a plurality of other leak inspection devices; and
an overall determining unit that determines presence of a leak as an inspection result by the present leak inspection device when predetermined number or more of the determination index values in the plurality of determination index values based on signals in any frequency band are larger than the predetermined threshold.

15. The leak inspection device according to claim 14, further comprising:
the leak position specifying unit further specifies, as a first determination index value, the largest determination index value from determination index values acquired by the determination index value acquiring unit, specifies, as the second determination index value, a largest determination index value from the other determination index values determined on the basis of signals in the same frequency band as that of the first determination index value, and specifies, as the leak position, the position between the installation position of the leak inspection device which determined the first determination index value and the installation position of the leak inspection device which determined the second determination index value.

16. The leak inspection device according to claim 9, further comprising:
a determination index value acquiring unit that acquires the determination index value from a plurality of other leak inspection devices; and
the leak position specifying unit further specifies, as a first determination index value, the largest determination index value from a determination index value determined by the present leak inspection device and determination index values acquired from other leak inspection devices, specifies, as the second determination index value, a largest determination index value from the other determination index values determined on the basis of signals in the same frequency band as that of the first determination index value, and specifies, as the leak position, the position between the installation position of the leak inspection device which determined the first determination index value and the installation position of the leak inspection device which determined the second determination index value.

17. A non-transitory computer-readable storage medium storing a leak inspection program, the leak inspection program comprising a set of instructions instructing at least one hardware processor to implement:
a vibration acquiring function of acquiring a signal indicating a vibration of a pipe or a vibration propagating from a pipe;
a filtering function of extracting, from the signal, a signal in one frequency band;
a characteristic value extracting function of dividing the extracted signal at predetermined time intervals, calculating an absolute value for each of a plurality of extreme values of level of the signal for each of the divided signals, and calculates a characteristic value by performing a statistical process on the plurality of the absolute values;
a leak determining function of calculating a determination index value by using the characteristic value, and determines presence of a leak on the pipe by determining that the determination index value is larger than a predetermined threshold; and
leak position specifying functions of acquiring the determination index values from other plural leak inspection devices and specifying, as a leak position, a position between an installation position of a leak inspection device indicating a largest determination index value and an installation position of a leak inspection device indicating a second largest determination index value in a present leak inspection device and the plurality of leak inspection devices.

18. A method of inspecting a leak in a pipe, executed by a computer, comprising:
acquiring a signal indicating a vibration of a pipe or a vibration propagating from a pipe;
extracting, from the signal, a signal in one frequency band;
dividing the extracted signal at predetermined time intervals, calculating an absolute value for each of a plurality of extreme values of level of the signal for each of the divided signals, and calculates a characteristic value by performing a statistical process on the plurality of the absolute values;
calculating a determination index value by using the characteristic value, and determines presence of a leak on the pipe by determining that the determination index value is larger than a predetermined threshold; and
acquiring the determination index values from other plural leak inspection devices and specifying, as a leak position, a position between an installation position of a leak inspection device indicating a largest determination index value and an installation position of a leak inspection device indicating a second largest determination index value in a present leak inspection device and the plurality of leak inspection devices.

* * * * *